United States Patent

Guissin et al.

(10) Patent No.: US 9,495,582 B2
(45) Date of Patent: Nov. 15, 2016

(54) DIGITAL MAKEUP

(71) Applicant: Digital Makeup Ltd, Tel Aviv (IL)

(72) Inventors: Rami Guissin, Beit Yanai (IL); Eitan Lavi, Hadera (IL); Guy Lifchitz, Avihail (IL)

(73) Assignee: DIGITAL MAKEUP LTD., Tel Aviv (IL)

( * ) Notice: Subject to any disclaimer, the term of this patent is extended or adjusted under 35 U.S.C. 154(b) by 41 days.

(21) Appl. No.: 14/362,669

(22) PCT Filed: Dec. 4, 2012

(86) PCT No.: PCT/IL2012/050504
§ 371 (c)(1),
(2) Date: Jun. 4, 2014

(87) PCT Pub. No.: WO2013/084233
PCT Pub. Date: Jun. 13, 2013

(65) Prior Publication Data
US 2014/0328509 A1  Nov. 6, 2014

Related U.S. Application Data

(60) Provisional application No. 61/706,407, filed on Sep. 27, 2012.

(30) Foreign Application Priority Data

Dec. 4, 2011 (IL) .......................... 216752
Apr. 19, 2012 (IL) .......................... 219286

(51) Int. Cl.
*G06K 9/00* (2006.01)
*G06T 5/00* (2006.01)
(Continued)

(52) U.S. Cl.
CPC ........... *G06K 9/00281* (2013.01); *G06T 5/002* (2013.01); *G06T 5/20* (2013.01); *G06T 7/0085* (2013.01); *G06T 2207/20024* (2013.01); *G06T 2207/30201* (2013.01)

(58) Field of Classification Search
CPC .............. G06K 9/00281; G06T 5/002; G06T 2207/20024; G06T 2207/30201; G06T 5/00; G06T 5/20
See application file for complete search history.

(56) References Cited

U.S. PATENT DOCUMENTS 4,446,484 A    5/1984   Powell
5,168,375 A *  12/1992  Reisch .................. G06F 17/145
                                                 375/240.2

(Continued)

FOREIGN PATENT DOCUMENTS

EP    1139651 A1   10/2001
EP    1441309 A2    7/2004

(Continued)

OTHER PUBLICATIONS

Yoshioka, Michifumi, Sigeru Omatu, and Hidekazu Yanagimoto. "Face image make-up system by using an ϵ-filter." Artificial Life and Robotics 15.2 (2010): 203-206.*

(Continued)

*Primary Examiner* — Stephen R Koziol
*Assistant Examiner* — Jonathan S Lee
(74) *Attorney, Agent, or Firm* — Browdy and Neimark, PPLC

(57) ABSTRACT

A system for processing an image of a human face, the system including a data processing and analyzing utility including a high-pass filtering module outputting a high-pass signal indicative of edges or contours of the face in the input image data; at least one band-pass filtering module outputting a bandpass signal indicative of low-contrast slowly-varying qualitative features of the face; a low-pass filtering module outputting a low-pass signal in which low-contrast regions are smoothed and high-contrast regions are preserved; a feature computation module calculating a localized feature of the image for a plurality of pixels of the image; a strength computation module determining a localized operand using the localized feature to determine a strength of filters to be used in the high-pass, band-pass, and low-pass filtering modules at the pixels, and transmitting the localized operand to the filtering modules; at least one transformation module altering a portion of the high-pass, the bandpass, or the low-pass signals; and an addition module adding the various signals together, thus yielding an output signal indicative of a characteristic of an altered image.

18 Claims, 30 Drawing Sheets

(51) Int. Cl.
*G06T 5/20* (2006.01)
*G06T 7/00* (2006.01)

(56) References Cited

U.S. PATENT DOCUMENTS

| | | | |
|---|---|---|---|
| 5,442,462 | A | 8/1995 | Guissin |
| 5,467,404 | A | 11/1995 | Vuylsteke et al. |
| 5,717,789 | A | 2/1998 | Anderson et al. |
| 5,799,111 | A | 8/1998 | Guissin |
| 6,502,583 | B1 | 1/2003 | Utsugi |
| 7,612,794 | B2 | 11/2009 | He et al. |
| 8,107,672 | B2 | 1/2012 | Goto |
| 2004/0234154 | A1* | 11/2004 | Hier ............... G06T 3/4007 382/254 |
| 2005/0226470 | A1 | 10/2005 | Kondo et al. |
| 2009/0016639 | A1 | 1/2009 | Ueda |
| 2009/0238486 | A1 | 9/2009 | Biezen et al. |
| 2010/0158330 | A1 | 6/2010 | Guissin et al. |
| 2010/0177981 | A1* | 7/2010 | Wang ............... G06T 7/0081 382/260 |
| 2014/0072190 | A1* | 3/2014 | Wu ............... G06T 7/2053 382/128 |
| 2016/0065864 | A1* | 3/2016 | Guissin ............... G06T 5/008 348/239 |

FOREIGN PATENT DOCUMENTS

| | | |
|---|---|---|
| WO | 2010084431 A1 | 7/2010 |
| WO | 2011055164 A1 | 5/2011 |

OTHER PUBLICATIONS

Ohchi, Shuji, Shinichiro Sumi, and Kaoru Arakawa. "A nonlinear filter system for beautifying facial images with contrast enhancement." Communications and Information Technologies (ISCIT), 2010 International Symposium on. IEEE, 2010.*

Arakawa, Kaoru. "Nonlinear digital filters for beautifying facial images in multimedia systems." Circuits and Systems, 2004. ISCAS'04. Proceedings of the 2004 International Symposium on. vol. 5. IEEE, 2004.*

Yoda, Akira, Yukihiro Iguchi, and Kaoru Arakawa. "Development of nonlinear filter bank system for real-time beautification of facial video using GPGPU." Communications and Information Technologies (ISCIT), 2010 International Symposium on. IEEE, 2010.*

Arakawa, Kaoru, and Kohei Nomoto. "Nonlinear denoising filter for images with interactive evolutionary computing considering the subjective assessment." Soft Computing in Industrial Applications, 2008. SMCia'08. IEEE Conference on. IEEE, 2008.*

Matsui, Takashi, Kaoru Arakawa, and Kohei Nomoto. "A nonlinear filter system for beautifying face images with enhancement using interactive evolutionary computing." Intelligent Signal Processing and Communications, 2006. ISPACS'06. International Symposium on. IEEE, 2006.*

Sumi, Shinichi, et al. "Interactive evolutionary image processing for face beautification using smaller population size." Intelligent Signal Processing and Communications Systems (ISPACS), 2012 International Symposium on. IEEE, 2012.*

Vaidyanathan "Multirate Digital Filters, Filter Banks, Polyphase Networks, and Applications: A Tutorial", Proceedings of the IEEE, New York, vol. 78, No. 1, pp. 56-93, Jan. 1, 1990.

Demirel et al: "Discrete Wavelet Transform-Based Satellite Image Resolution Enhancement", IEEE Transactions of Geoscience and Remote Sensing, IEEE Service Center, Piscataway, NJ, US, 49 (6) 1997-2004, (Jun. 1, 2011).

Shen et al: "Detail-preserving exposure fusion using subband architecture", The Visiual Computer; International Journal of Computer Graphics, Springer, Berlin, DE, 28 (5) 463-473, (Sep. 13, 2011).

European Search Report, dated Jul. 29, 2015. in corresponding application No. EP12854815.

* cited by examiner (General Art)

(General Art)

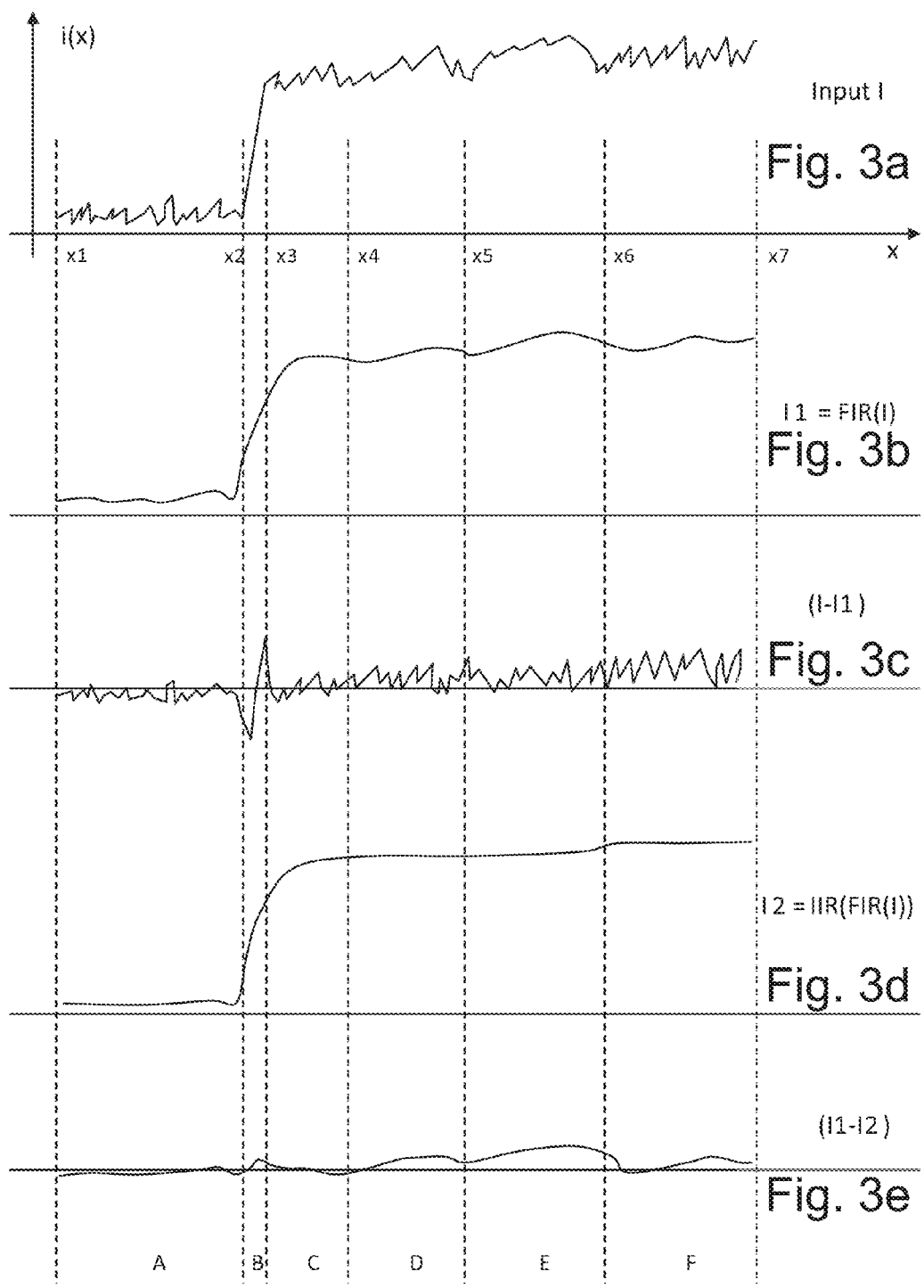

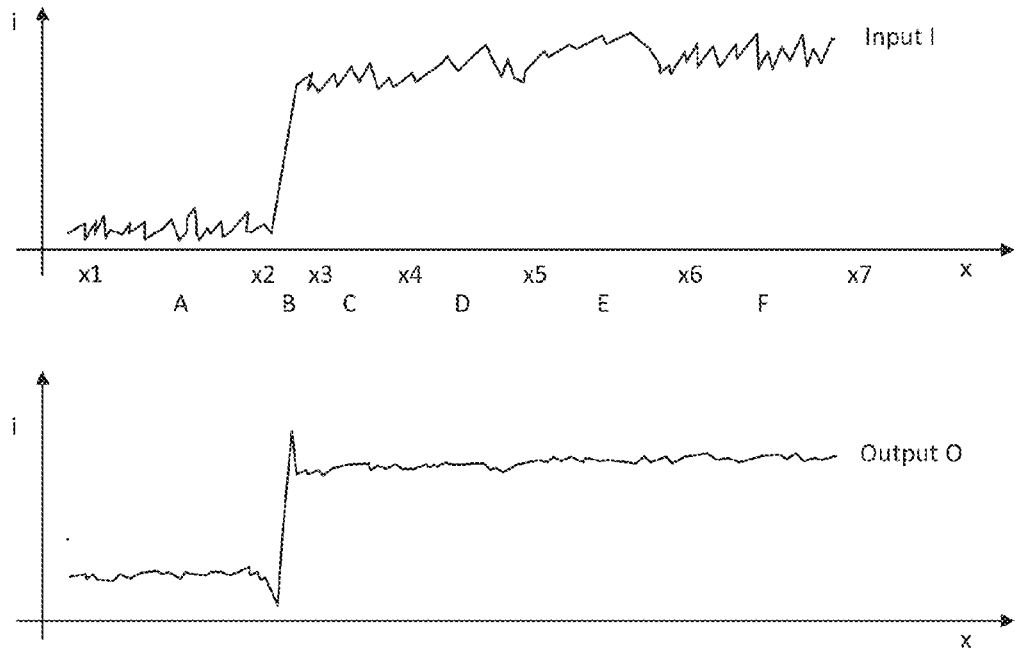
Fig. 3f
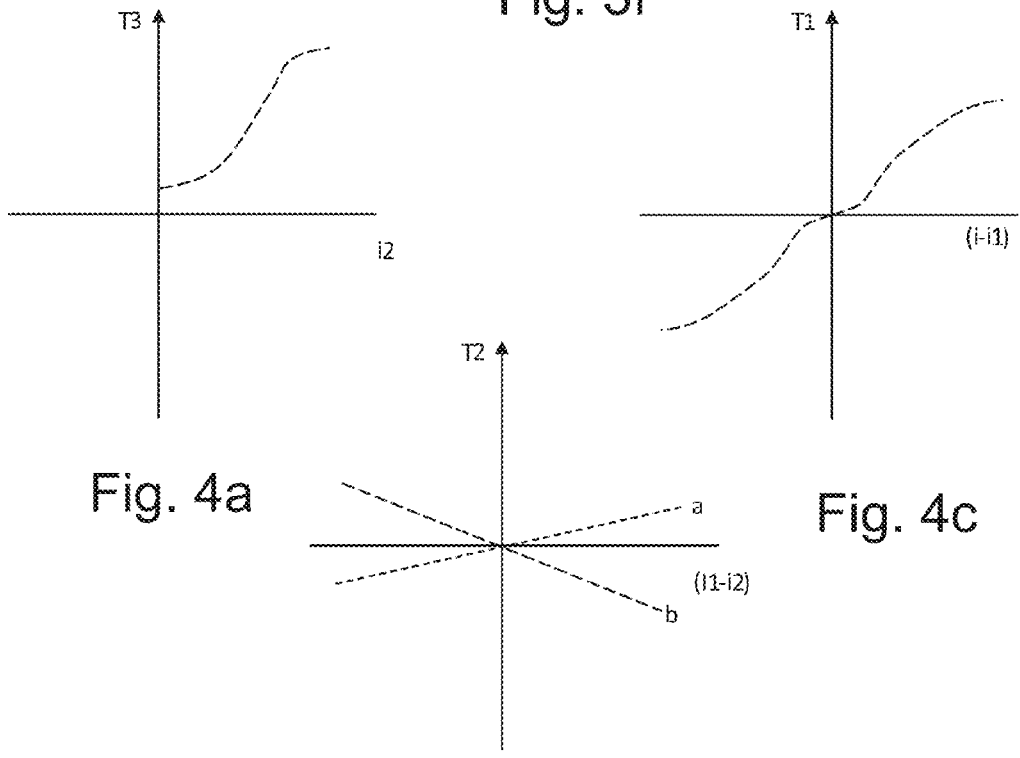
Fig. 4a
Fig. 4b
Fig. 4c

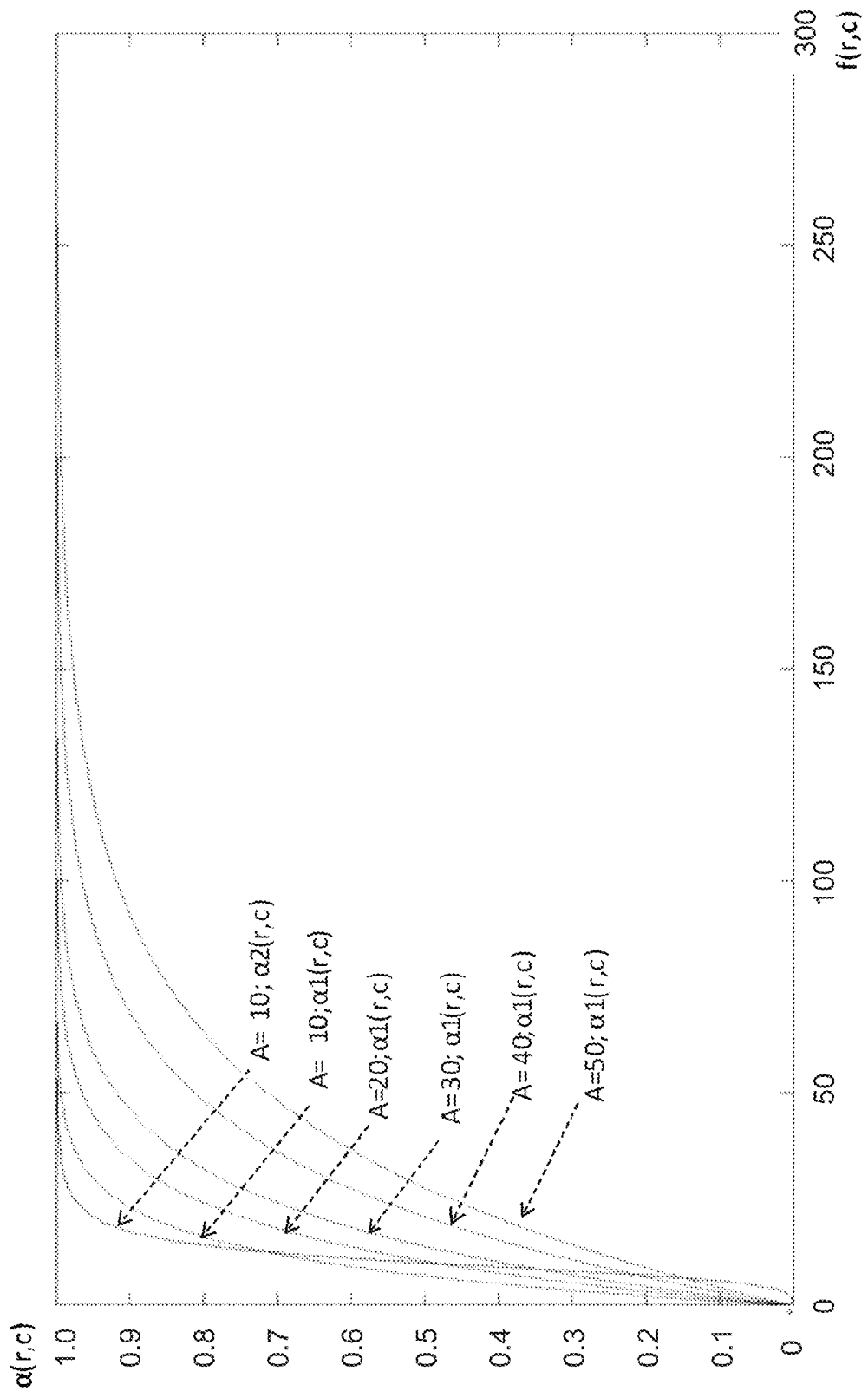

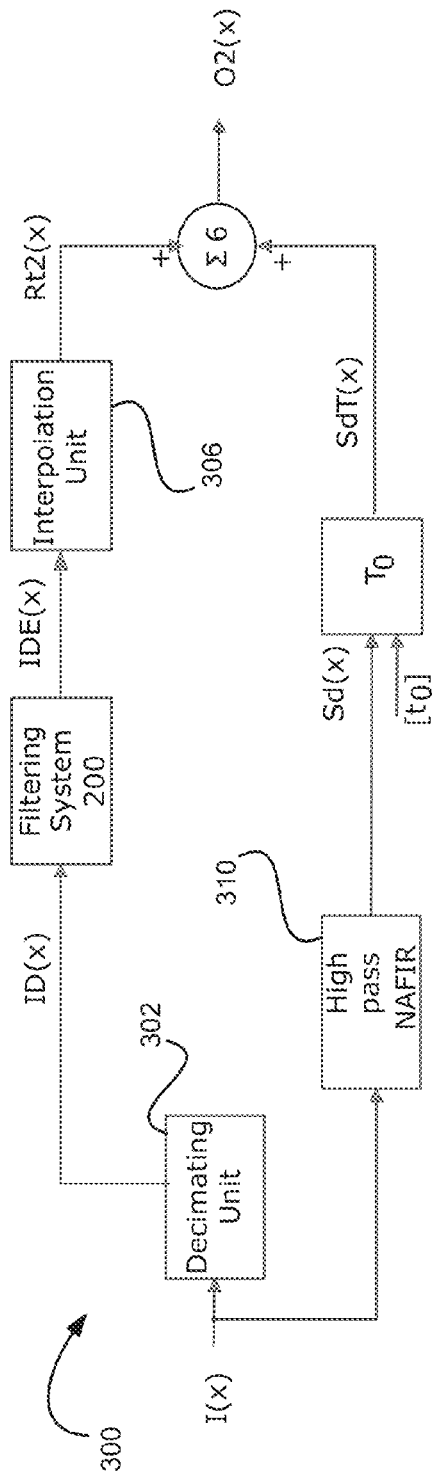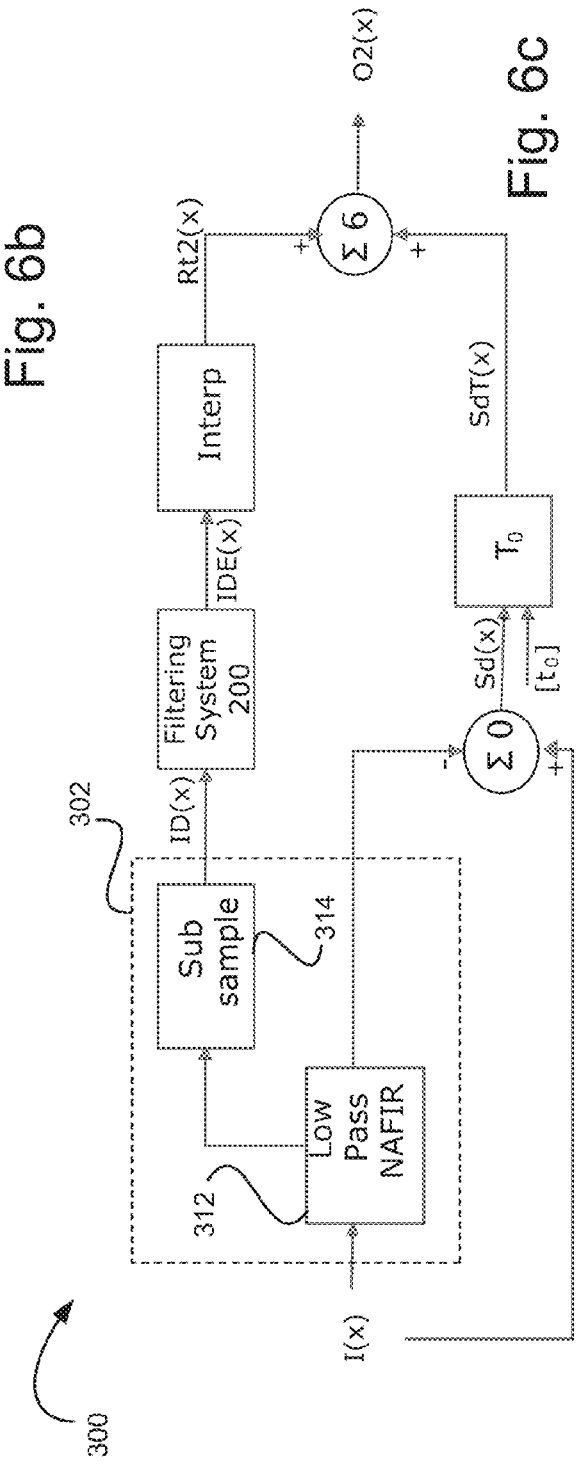
Fig. 6b
Fig. 6c

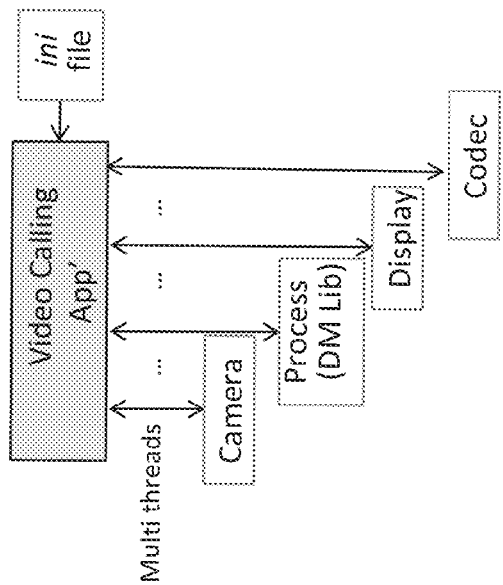
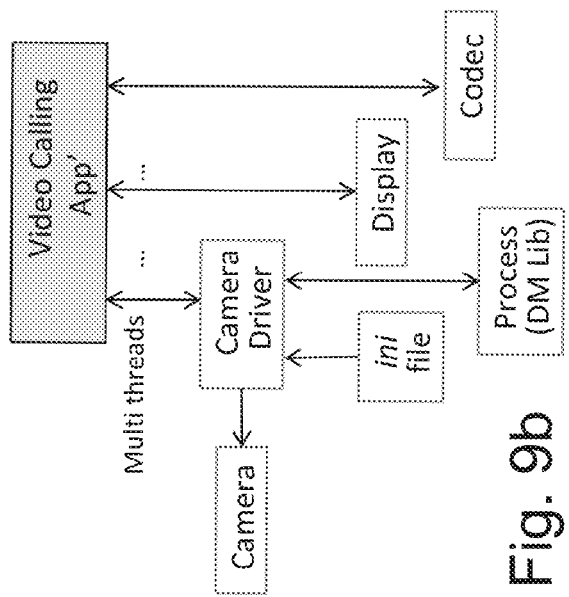
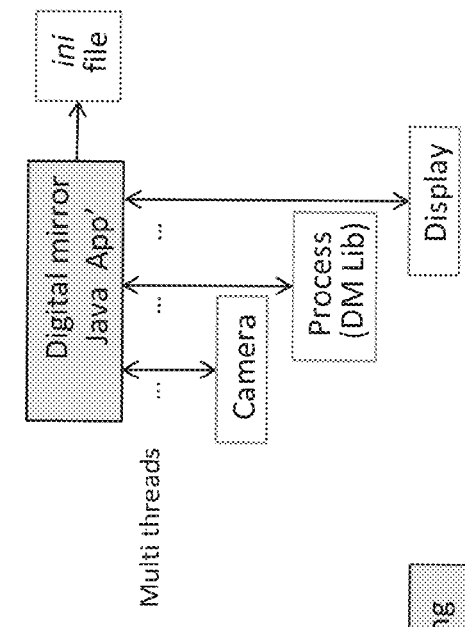
Fig. 9a
Fig. 9b
Fig. 9c

DIGITAL MAKEUP

TECHNOLOGICAL FIELD

The present invention is in the field of image processing, and more particularly, in the field of processing images of human faces.

BACKGROUND

Many techniques have been developed for altering an image of a human face, in order to improve the face's appearance.

In U.S. Pat. No. 8,107,672, a makeup simulation system is disclosed. The simulation system applies makeup to a video having an image of the face of a user captured thereon, and is characterized by image capturing means for capturing the image of the face of the user and outputting the video, control means for receiving the video output from the image capturing means, performing image processing on the video, and outputting the video; and display means for displaying the video output from the control means, wherein the control means includes face recognition means for recognizing the face of the user from the video based on predetermined tracking points; and makeup processing means for applying a predetermined makeup on the face of the user included in the video based on the tracking points and outputting the video to the display means.

U.S. Pat. No. 6,502,583 discloses a method which includes determining a requested face which is requested by the person who wants the photograph to be corrected or wants to be made up, and creating an image of the face corrected or made up by executing image-processing such as contour-combining of the original face image or the face of the person based on the requested face.

GENERAL DESCRIPTION

There is a need in the art for a novel technique for improving an image of a face, without a need to recognize specific regions of the face, and without requiring extensive processing power.

The above mentioned U.S. Pat. No. 8,107,672 and U.S. Pat. No. 6,502,583 describe face recognition techniques to recognize local features (tracking points) of the face, and process the image based on the recognized local features.

Some other known image processing techniques, described in U.S. Pat. No. 5,442,462 and U.S. Pat. No. 5,799,111, utilize adaptive smoothing filters applied to the images. Adaptive one-directional and two-directional processing are used to extract, on a pixel-by-pixel basis, a criterion which determines a smoothing procedure suitable for the pixel signal and noise behavior. More specifically, a parameter (e.g., strength) of the filter to be applied to a given pixel is dependent on local characteristics of the image. For example, in order to determine the strength of the filter for a given pixel of the image, a difference is calculated between a value of the given pixel and a value of an adjacently preceding value in the first sequence. The strength of the filter is calculated according to this difference. Because a parameter of the adaptive filter is calculated locally for each direction, the techniques of U.S. Pat. No. 5,442,462 and U.S. Pat. No. 5,799,111 may involve intensive processing and their execution may be time consuming. This may make it difficult to alter the image in real-time or near-real-time, and thus might not be useful for digital makeup applications.

The perceived appearance of human facial beauty is known to comprise multiple underlying factors, including the following: (a) facial features acuity and vitality, (b) facial skin luster, clarity and tone, and (c) facial morphology, structure and alignment. Such factors are typically improved by cosmetic makeup techniques utilizing various substances (e.g. colored and transparent liquids, oils, powders) and tools (e.g. brushes, spunges, liners, air brushes etc).

In professional makeup terms, (a) vitality is typically achieved with eye liners and lip liners (e.g. often pencil and liquid liners), (b) skin luster, clarity and tone is improved by applying a foundation, concealer, blush and powder, and (c) improved morphology and structure is attained by applying respective highlights and shadows in specific facial locations.

The present invention is based on the inventor's understanding of the main steps of a makeup process, which Foundation, Concealer, Liner, Morphology, Blush and Powder. More specifically:

Foundation comprises a step of evening out skin texture by applying a transparent foundation substance on the entire face thereby creating a canvas, namely a flat, homogeneous, whitish surface of the entire face area, on which all subsequent steps are applied onto. This is somewhat similar to a painter starting a work of art from a flat white canvas.

Concealer comprises a step of applying locally a skin color-matched concealing substance that covers local skin imperfections and irregularities such as pimples, acne, inflammations, areas of redness or discoloration, pores, birthmarks, blemishes, freckles, wrinkles, creases, spider veins, dark circles under the eye, green-blue areas surrounding the lips etc. Each of these irregularities may require a different covering action, such as the spreading of the concealer in directions that best blend the concealed effect with neighboring regular skin areas. For example, dark circles under the eye are typically concealed by applying concealer on the general area and then spreading the material in multiple directions to the sides and downwards (but not upwards onto the eyes), followed by spreading the concealer in opposite directions until evening out and achieving a desired blend.

Liners accentuate contours and edges of important facial locations such as lips and eyes, thereby increasing the facial vitality.

Morphology comprises a step of restructuring the face, if needed, by applying shading and highlighting to specific areas of the face. Dark colors (shaders) shade and make areas recede, such as for example hollows of the cheek, temples, under chin and sides of nose. Light colors (highlighters) make things come forward, for example apple of the cheek, under the eye, browbone and middle of the chin.

Blush comprises a step of adding color and vitality to the face, either over local areas or over the entire face.

Powder comprises a step of adding a matte powder over the entire face, or over specific areas of the face or head that generate increased shining that often depends on the illumination conditions and angles.

The present invention relates to a digital image processing technique for altering the image of a human face, namely Digital Makeup (DM). This technique is based on the inventors' realization that many of the above makeup artist actions may be closely imitated by specifically designed algorithms. In accordance with the present invention, the DM processing is applied to an entire image that includes a human face without specifically requiring any knowledge of location of the face in the image, facial structure, facial feature locations, or facial skin geometries and borders. The DM processing simulates some of the above main steps of the makeup process by the following algorithms: the application of a foundation is simulated by smoothing facial pixels, the application of a concealer is simulated by detecting local facial variations and smoothing these variations into the surrounding skin tone, the actions of a liner is simulated by extracting facial edges and contours, and retaining or enhancing them, the application of powder is simulated by identifying extreme highlights and further smoothing such variations using image transformations, thereby imitating actions of a sponge or brush. Optionally, the application of blush may be imitated by sensing image areas of slight color variations and enhancing them, and/or implementing a global non-linear color histogram transformation operation applied to color image components thereby enhancing the image color saturation that affects mostly the facial areas.

The above is achieved in the present invention by combining different kinds of digital filters (which will be defined below) to construct an improved facial image representation. In the present invention, the facial image data is decomposed into different component signals indicative of the face's qualitative features (e.g., details and different kinds of imperfections), by respective differencing between outputs of the filters (where the input of a filter is either a signal indicative of the original facial image, or an output of a previous filter which received the signal indicative of the original facial image as an input). The differencing results in a high-pass signal, at least one bandpass signal, and one low-pass signal. Respective transformations and/or filters are applied to at least one of the component signals, to increase or decrease the strength of desired facial qualitative features (for example, in order to achieve improved digital makeup effects such as foundation, concealer, liner, blush and powder). Finally, the transformed/filtered component signals are summed together to form an output signal, which can be converted into an output image. It should be noted that after the different facial qualitative features are separated into their corresponding component signals via the multiple-filtering-and-differencing techniques of the present invention, some qualitative features may be strengthened and others may be smoothed out or attenuated. For example, the technique of the present invention may improve the appearance of a face by attenuating the undesirable qualitative features (e.g. skin texture, wrinkles, puffiness, acne, scars, blemishes) and strengthening the desirable qualitative features (face's details such as contours and edges). However, digital makeup may be used in the same way in order to provide an output image in which the face's appearance is deteriorated (e.g. aging instead of anti-aging), by strengthening the undesirable qualitative features and/or attenuating the desirable ones.

Optionally, the technique of the present invention may be further modified for improving the facial morphology. This is achieved by typically applying highlights and shadows to specific facial locations. For this, a facial feature detection and/or facial skin detection/segmentation operation is required, as such highlights and shadows are to be placed in specific positions with respect to such facial features (e.g. eyes, brows, lips, nose, chin, cheeks, cheek bones, forehead etc). Such face detection and skin segmentation is required in cases the DM process is to be applied solely and selectively to facial regions and not to any background regions. The present invention does not require such face detection and skin segmentation for its operation, although it may use such segmentation for further improvements in some imaging applications.

Therefore, an aspect of some embodiments of the present invention relates to a system for processing an image of a human face, the system comprising a data processing and analyzing utility comprising: a high-pass filtering module configured for receiving an input image data indicative of a characteristic of the image and outputting a high-pass signal indicative of at least one of edges and contours of the face in the input image data; at least one band-pass filtering module configured for receiving data indicative of the input image data and outputting a bandpass signal indicative of low-contrast slowly-varying qualitative features of the face; a low-pass filtering module configured for receiving data indicative of the input image data and outputting a low-pass signal in which low-contrast regions are smoothed and high-contrast regions are preserved; a feature computation module configured for receiving the input image data and calculating a localized feature of the image for a plurality of pixels of the image; a strength computation module configured for receiving said localized feature from the feature computation module, using the localized feature for determining a localized operand to determine a strength of filters to be used in each of the high-pass filtering module, band-pass filtering module, low-pass filtering module at said plurality of the pixels, and transmitting the localized operand to each of said filtering modules; at least one transformation module configured for receiving and altering at least a portion of at least one of the high-pass signal, the bandpass signal, and the low-pass signal; and an addition module configured for receiving the high-pass signal, the bandpass signal, and the low-pass signal after said at least portion thereof has been altered, and for adding the received signals together, thus yielding an output signal indicative of a characteristic of an altered image.

In a variant, the high-pass filtering module comprises: a first filtering utility configured for receiving the input image data, applying a first smoothing filter thereto, and outputting a first smoothed signal; and a first subtracting utility for subtracting the first smoothed signal from the input image data, thus yielding the high-pass signal.

Optionally, the at least one bandpass filtering device comprises a second filtering utility, configured for receiving the input image data, applying a second smoothing filter thereto, and outputting a second smoothed signal; and a second subtracting utility for subtracting the second smoothed signal from the first smoothed signal, thus yielding the at least one bandpass signal.

Optionally, the low-pass filtering module comprises the second filtering utility, the second smoothed signal being the low-pass signal.

In another variant, the at least one bandpass filtering module comprises: a second filtering utility configured for receiving the first smoothed signal, applying a second smoothing filter to the first smoothed signal, and outputting a second smoothed signal; and a second subtracting utility for subtracting the second smoothed signal from the first smoothed signal, thus yielding the at least one bandpass signal.

Optionally, the low-pass filtering module comprises the second filtering unit, the second smoothed signal being the low-pass signal.

In a variant, the strength computation module is configured for determining the localized operand to determine a strength of the smoothing filters at the plurality of the pixels, and transmitting the localized operand to the filtering utilities.

In another variant, at least one of the filtering utilities is configured for receiving an individual global parameter, and using the global parameter and the localized operand to calculate the strength of the respective smoothing filter.

In yet another variant, the strength computation module is configured for determining a plurality of localized operands, each localized operand corresponding to a respective filtering utility and being indicative of the strength of the respective smoothing filter; and each filtering utility is configured for using the respective localized operand for determining the strength of the respective smoothing filter.

In a further variant, at least one of the filtering utilities is configured for applying a multi-dimensional adaptive smoothing filter to a respective received signal.

In yet another variant, at least one of the filtering utilities is configured for applying a linear smoothing filter to a respective received signal. Optionally, the first filtering utility is configured for applying the linear smoothing filter.

According to some embodiments of the present invention the above-defined system comprises an array of the bandpass filtering modules, wherein each bandpass filtering module comprises: a respective filtering utility configured for receiving said data indicative of the input image data and applying a respective smoothing filter thereto, and outputting a respective smoothed signal; and a respective subtracting utility for subtracting the respective smoothed signal from a previously smoothed signal output by a preceding filtering utility comprised in a preceding filtering module, thus yielding a respective bandpass signal.

Optionally, the low-pass filtering module comprises a filtering utility being a part of a last bandpass filtering module in said array of the bandpass filtering modules, to generate a last smoothed signal being the low-pass signal.

According to some embodiments of the present invention, there is provided a system comprising: a first high-pass filtering module configured for receiving an input image data indicative of a characteristic of the image and outputting a first high-pass signal indicative of at least edges and/or contours of the face in the image; a decimating module configured for receiving the input image data, and processing the received image data for reducing a size of the input image to produce a first decimated image, and outputting a decimated signal indicative of the first decimated image; a filtering system as described above, configured for receiving and processing the first decimated signal, and outputting a first output signal indicative of a first output image; an interpolation module configured for receiving the first output signal, and interpolating the first output signal to output an interpolated signal indicative of an image having a size equal to the size of the input image; and a first addition module configured for receiving the interpolated signal and the first output signal, and adding the interpolated signal and the first output signal together, thus yielding a second output signal indicative of a characteristic of an altered image.

Optionally, the system comprises a first transformation module configured for altering at least a portion of the first high-pass signal to output a first transformed signal, the first addition module being configured for receiving the interpolated signal and the first transformed signal, and adding them together, thus yielding a second output signal indicative of a characteristic of an altered image In a variant, the first high-pass filtering module comprises: a second interpolation module configured for receiving the decimated signal and interpolating the decimated signal to output a second interpolated signal, the first high-pass filtering module being configured for receiving the input image data and the second interpolated signal; and a first subtracting unit configured for subtracting the second interpolated signal from the input image data thus yielding the first high-pass signal.

In another variant, the system comprises a second decimating module configured for performing a second decimation on the first decimated signal to output a second decimated signal, which is received and processed by said filtering system to output the first output signal.

Another aspect of some embodiments of the present invention relates to a method for processing an input signal indicative of a characteristic of an image of a human face, the method being implemented by a data processing and analyzing utility and comprising:

(i) processing input image data to calculate a localized feature of the image for a plurality of pixels of the image;

(ii) using the localized feature for determining a localized operand;

(iii) applying a high-pass filter, at least one bandpass filter, and a low-pass filter to data indicative of the input image data, thus generating a high-pass component signal, at least one bandpass component signal, and a low-pass component signal, such that a strength of each filter is dependent on the localized operand;

(iv) applying at least one transformation to at least one of the high-pass component signal, bandpass component signal, and low-pass component signal, for altering at least a portion of at least one of the component signals;

(v) adding the component signals after at least one of them component has been altered, thus yielding an output signal indicative of a characteristic of an altered image.

According to some embodiments of the present invention, there is provided a method for processing an input signal indicative of indicative of a characteristic of an image of a human face, the method comprising:

applying a first high-pass filter to input image data to generate a first high-pass signal indicative of at least edges and/or contours of the face in the image;

decimating the input image data to output a decimated signal indicative of an image of reduced size with respect to the input image;

applying steps (i) to (v) described above to the decimated signal and outputting a first output signal;

interpolating the first output signal to output an interpolated signal indicative of an image having a size equal to the size of the input image;

adding the first output signal to the interpolated signal thus yielding a second output signal indicative of a characteristic of an altered image.

A further aspect of some embodiments of the present invention relates to a non-transitory computer readable medium that is useful in conjunction with a computer and on which is stored a data processing and analyzing utility configured to cause the computer to respond to input image data to carry out the following:

processing input image data to calculate a localized feature of the image for a plurality of pixels of the image;

using the localized feature for determining a localized operand;

applying a high-pass filter, at least one bandpass filter, and a low-pass filter to data indicative of the input image data, thus generating a high-pass component signal, at least one bandpass component signal, and a low-pass component signal, such that a strength of each filter is dependent on the localized operand;

applying at least one transformation to at least one of the high-pass component signal, bandpass component signal, and low-pass component signal, for altering at least a portion of at least one of the component signals;

adding the component signals after at least one of them component has been altered, thus yielding an output signal indicative of a characteristic of an altered image.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3a-3f are plots illustrating examples of an input signal, component signals yielded by different filters applied to the input signal, and an output signal, according to some embodiments of the present invention;

FIGS. 4a-4c are plots illustrating examples of different transformations to be applied on different component signals according to some embodiments of the present invention;

FIGS. 5a-5c are plots illustrating examples of different operands which determine the strength of different smoothing filters used in some embodiments of the present invention;

FIG. 6a-6d are block diagrams illustrate a system 300 of the present invention, for processing an input image of a human face, where the input image is processed along two different paths, and the outputs of the two processing paths are combined to yield an output image;

FIGS. 8a-8d and 9a-9c are block diagrams illustrating examples of the present invention, in which the DM processing described above is performed via video compression utilizing various codecs, and video transmission utilizing various networks and platforms;

DETAILED DESCRIPTION OF EMBODIMENTS

Figure 1A:
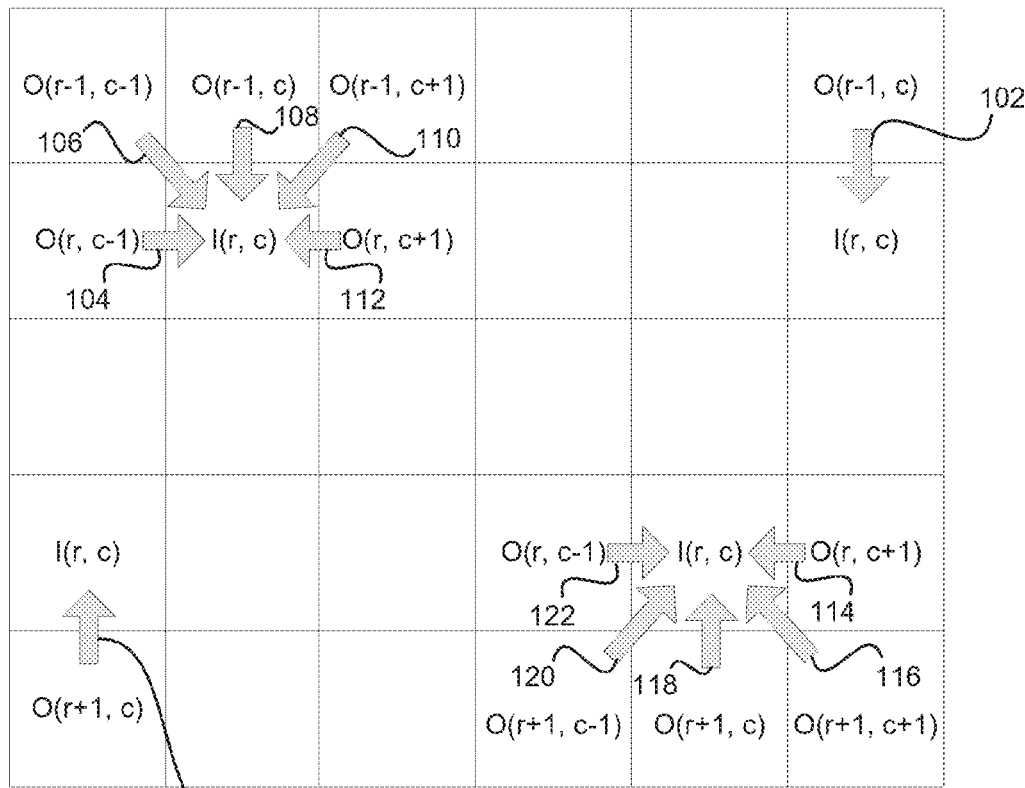
FIGS. 1a-1b are drawings illustrating some image-processing techniques known in the general art.

Before describing the current invention, some terms that will be used hereafter are to be defined.

In image processing, a smoothing filter is a processing/function which is applied to an input image data in order to produce an output image data, in which the difference in a characteristic of adjacent pixels is reduced as compared to that of the input image data. Typically, a parameter characterizing a smoothing filter is the strength of the filter. The stronger (coarser) the filter, the less difference there is between the characteristics of adjacent pixels. A weaker (finer) filter alters the pixels of the input image in a lesser degree and accordingly the difference between the characteristics of adjacent pixels in the output image is closer to that of the input image data.

An adaptive smoothing filter is a smoothing filter that self-adjusts its parameter(s), such as strength, according to an optimization algorithm driven by a difference in a characteristic of adjacent pixels. In the present invention, the characteristic of the pixels may generally be represented by an intensity of one or more light components (e.g. one or more colors) of the pixel. For example, an adaptive smoothing filter may adjust its strength according to a difference between the intensities of two adjacent pixels.

A bandpass filter is a filter which attenuates signals having a characteristic outside a desired band, while signals having the characteristic within the desired band are substantially unchanged. In the above mentioned U.S. Pat. No. 5,442,462 and U.S. Pat. No. 5,799,111, it is shown that a difference between smoothing filters of different strengths is a bandpass filter. In another known technique described in US Patent Application 2010/0158330, it is shown that a bandpass filter can be determined as a difference between adaptive smoothing filters applied on the same input, or as a difference between a first adaptive smoothing filter applied on the input and a second adaptive smoothing filter applied on the output of the first smoothing filter. For the purpose of this invention the characteristic may be value or luminance.

A finite impulse response filter (FIR) is a filter that uses one or more characteristics of the input signal, in order to produce an output. An infinite impulse response filter (IIR) is a filter that uses one or more characteristics of the input signal as well as one or more characteristics of a signal which is the output of a filtering of the input signal through the same filter.

An adaptive IIR filter may be defined as a directional adaptive filter. This means that in order to alter a given pixel having a certain coordinate (r, c), a difference in the pixel characteristic is calculated between the given pixel and a previously filtered pixel. The process is repeated again for the next pixel, which lies on a line defined by the first and second pixel. An illustration of one-directional adaptive filters (ODAFs) can be seen in FIG. 1a. For example a top-to-bottom adaptive filter (TTBAF) 102 uses the difference between the characteristic of the input pixel I(r, c) and the characteristic of an output O(r−1, c) of the same filter at an adjacent pixel above the input pixel. In the same figure, a bottom-to-top adaptive filter (BTTAF) 100 is illustrated. The BTTAF uses the difference between the characteristic of the input pixel I(r, c) and the characteristic of an output O(r+1, c) of the same filter at an adjacent pixel located below the input pixel.

A multi-directional adaptive filter (MDAF) is a filter which alters a given pixel of an input image, by considering the difference between a characteristic of the given pixel and the characteristics of a plurality of pixels adjacent to the given pixel. The multi-directional adaptive filter may be implemented in many different manners. In one example, the output characteristic of the given pixel may be determined according to an average of the differences between the characteristic of the input pixel and the characteristics of the surrounding filtered pixels.

In another non-limiting example, illustrated in FIG. 1a, an IIR MDAF is illustrated. In order to calculate an output characteristic of a pixel (r, c) having a given input characteristic I(r, c), an intermediate characteristic of the given pixel denoted as P(r,c) is calculated by weighting the three ODAFs from a previously processed row, $$P(r,c)=w_1 \cdot ODAF1(r,c)+w_2 \cdot ODAF2(r,c)+w_3 \cdot ODAF3(r,c) \quad \text{eq. 1}$$

$$w_1+w_2+w_3=1 \quad \text{eq. 2}$$

ODAF1(r, c) is denoted by the numeral 106, ODAF2(r, c) is denoted by the numeral 108, ODAF3(r, c) is denoted by the numeral 110. A given ODAF is a function of the difference between the given pixel's input characteristic and the characteristic of an adjacent pixel which was previously filtered.

$$ODAF_1(r,c)=\text{function}[I(r,c)-O(r-1,c-1)] \quad \text{eq. 3}$$

$$ODAF_2(r,c)=\text{function}[I(r,c)-O(r-1,c)] \quad \text{eq. 4}$$

$$ODAF_3(r,c)=\text{function}[I(r,c)-O(r-1,c+1)] \quad \text{eq. 5}$$

O(r−1, c−1) is the characteristic of a previously filtered pixel located at (r−1, c−1). O(r−1, c) is the characteristic of a previously filtered pixel located at (r−1, c). O(r−1, c+1) is the characteristic of a previously filtered pixel located at (r−1, c+1). Thus ODAF$_1$ is a function of the difference [I(r, c)−O(r−1, c−1)]. Optionally, O(r−1, c−1)=TTBAF(r−1, c−1), O(r−1, c)=TTBAF(r−1, c), and O(r−1, c+1)=TTBAF (r−1, c+1).

The intermediate characteristic P(r,c) is further filtered from the side pixels (r, c−1) and (r, c+1) in the same manner as before. Since the average direction of the filtering from the pixels at (r−1, c−1), (r−1, c), (r−1, c+1), (r, c−1), and (r, c+1) is downward, the result of the filtering from five directions can be considered to be a TTBAF.

$$TTBAF(r,c)=w_4 \cdot ODAF_4(r,c)+w_5 \cdot ODAF_5(r,c) \quad \text{eq. 6}$$

$$w_4+w_5=1 \quad \text{eq. 7}$$

ODAF4(r, c) is denoted by the numeral 104, ODAF5(r, c) is denoted by the numeral 112.

$$ODAF_4(r,c)=\text{function}[P(r,c)-O(r,c-1)] \quad \text{eq. 8}$$

$$ODAF_5(r,c)=\text{function}[P(r,c)-O(r-1,c)] \quad \text{eq. 9}$$

Optionally, $$ODAF_4(r,c)=\text{function}[P(r,c)-ODAF_4(r,c-1)] \quad \text{eq. 10}$$

$$ODAF_5(r,c)=\text{function}[P(r,c)-ODAF_4(r-1,c)] \quad \text{eq. 11}$$

The same preparatory filtering process is performed with one directional filters 116, 118, and 120, and the result is filtered via side filters 114 and 122, in order to obtain a BTTAF(r, c).

Finally, weighting the TTBAF and BTTAF achieves the output of a multi-directional and multi-dimensional adaptive filter (MDAF), $$MDAF(r,c)=w_6 \cdot TTBAF(r,c)+w_7 \cdot BTTAF(r,c) \quad \text{eq. 12}$$

$$w_6+w_7=1 \quad \text{eq. 13}$$

It can be seen that filtering just one pixel via an MDAF requires a plurality of operations. Namely, for each direction, a strength of the filter is to be calculated, and the filter is to be applied to the desired pixel, in order to calculate the characteristic of the pixel. This process may therefore require high processing power and/or may be performed slowly, and might not be preferable for digital makeup application, especially when real time digital makeup is to be performed.

Figure 1B:
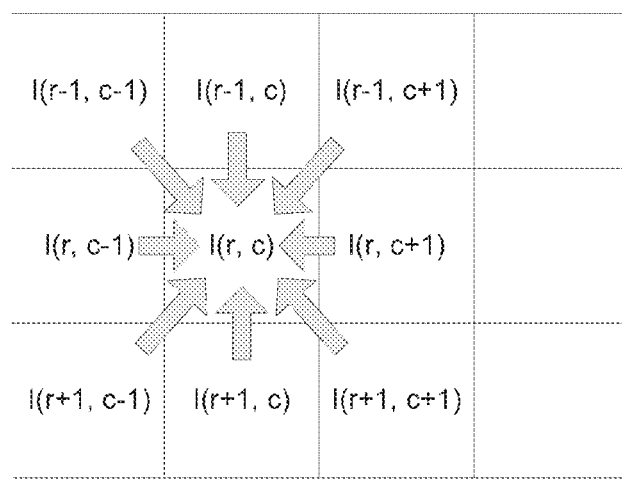

Another kind of MDAF is an MDAF that is constructed as an FIR filter, as depicted in FIG. 1b. In the art, this kind of filter is called a bilateral filter. In this non-limiting example, the corresponding MDAF at each pixel depends on an adaptive weighting function of neighboring pixels, whereby the output OP(r, c) of the MDAF at pixel (r, c) is given by:

$$OP(r, c) = \sum_i w_i \cdot ODAF_i(r, c) \quad \text{eq. 15}$$

$$\sum_i w_i = 1 \quad \text{eq. 16}$$

$$ODAF_1 = \text{function}[I(r, c) - I(r-1, c-1)] \quad \text{eq. 17}$$

$$ODAF_2 = \text{function}[I(r, c) - I(r-1, c)] \quad \text{eq. 18}$$

$$ODAF_3 = \text{function}[I(r, c) - I(r-1, c+1)] \quad \text{eq. 19}$$

$$ODAF_4 = \text{function}[I(r, c) - I(r, c-1)] \quad \text{eq. 20}$$

$$ODAF_5 = \text{function}[I(r, c) - I(r, c+1)] \quad \text{eq. 21}$$

$$ODAF_6 = \text{function}[I(r, c) - I(r+1, c-1)] \quad \text{eq. 22}$$

$$ODAF_7 = \text{function}[I(r, c) - I(r+1, c)] \quad \text{eq. 23}$$

$$ODAF_8 = \text{function}[I(r, c) - I(r+1, c+1)] \quad \text{eq. 24}$$

In the art, there is also another known FIR bilateral filter based technique, also known as "smart blur" technique. In the latter technique, the differences between the characteristic of a given pixel and the characteristics of the neighboring pixels are thresholded, and their respective weights (e.g. Gaussian weights) are used only for those neighboring pixels having respective differences exceeding a predefined threshold. Since not all Gaussian weights may be used in each pixel, a re-normalization is required to maintain the sum of said weights equaling unity.

Reference is now made to FIGS. 2a-2d illustrating an image processing system 200 of the present invention configured and operable for altering facial features in input image data to perform digital makeup. In the system 200 a plurality of filters is used which operate together to decompose an input data (representative of an input image) into a plurality of output signals, and the output signals are transformed and added to produce together a final output data (output image), where the filters are configured such that their strengths are dependent on a localized feature of the input image calculated on a pixel by pixel basis. The localized feature may be determined pixel-by-pixel, or for different groups of adjacent pixels. In the latter case, the group of pixels may form a shape which is oriented according to a desired structure of the image (e.g. it may be oriented along an edge or contour). The group of pixels may be chosen according to the luminescence and/or the chrominance of the image. The localized feature may have high resolution (the same feature is common to a low number of adjacent pixels), a low resolution (the same feature is common to a low number of adjacent pixels), or a medium resolution therebetween.

The system 200 of FIGS. 2a-2d is used to alter the original facial image (input image data). The alterations in some examples of the present invention generally relate to improving the face in the image. However, the system 200 may be used to deteriorate the image, or to alter it in other manners (e.g. aging, simulating facepaint or creating a cartoon-like image), as will be shown below in the examples.

Figure 2A:
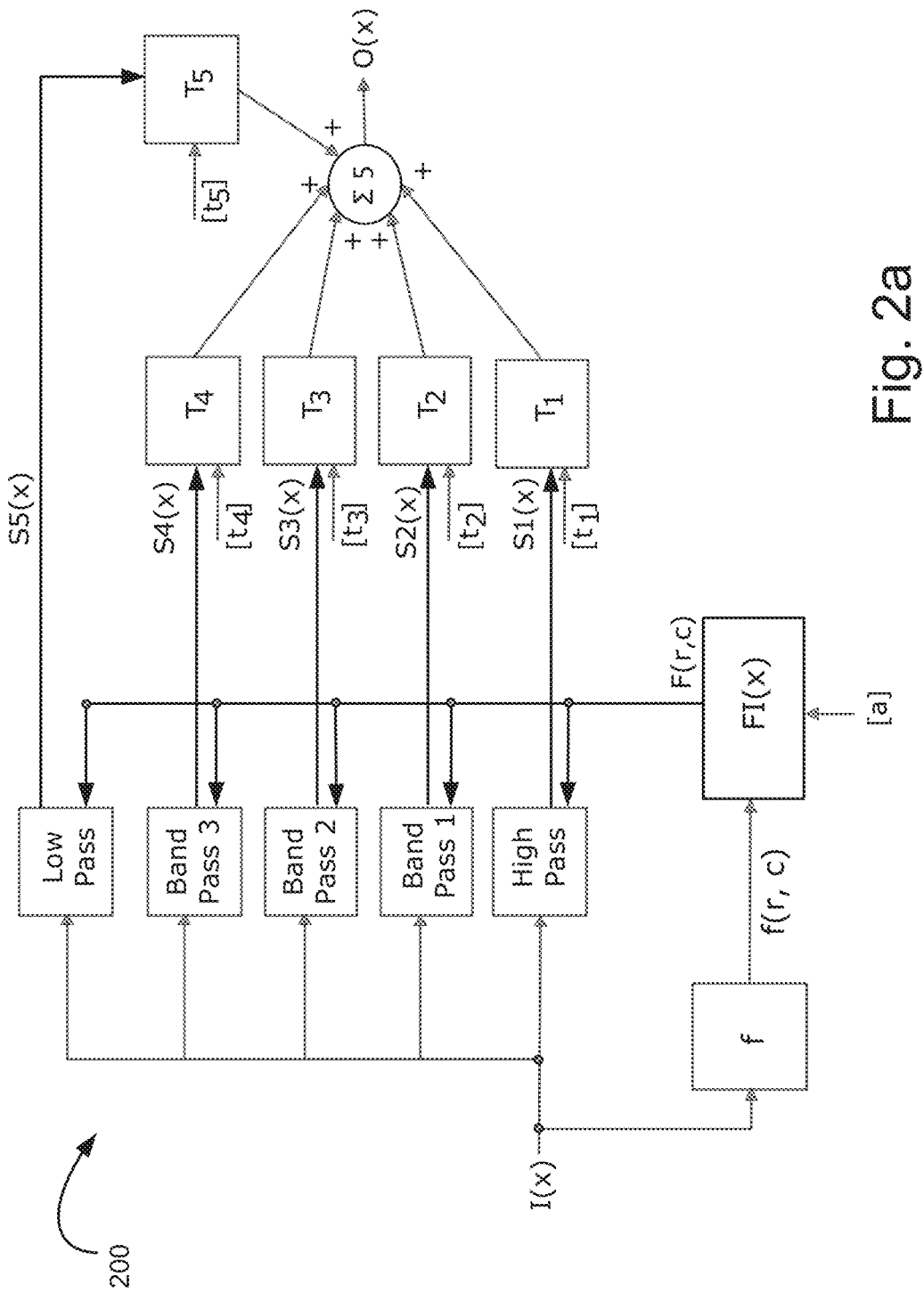
FIGS. 2a-2d are drawings illustrating different embodiments of a technique of the present invention for altering qualitative features of a face in an input image, by filtering the image through a plurality of filters, where the characteristics of each filter at each pixel depends on a local feature of the image at each pixel.

As shown in FIG. 2a, the system 200 is generally a computer system including inter alia such utilities as data input and output utilities and memory utility (which are not specifically shown), and a data processing and analyzing utility (software and/or hardware). The latter includes a high-pass filtering module, at least one band-pass filtering module, a low-pass filtering module, a feature computation module f, a strength computation module $FI(x)$, at least one transformation module—five such modules being shown in the present not limiting example T1-T5, and an addition unit $\Sigma 5$. The high-pass filtering module is configured for receiving an input signal $I(x)$ indicative of a characteristic of the original image and outputting a high-pass signal indicative of at least edges and/or contours of the face in the image. The band-pass filtering module is configured for receiving data indicative of the input signal (i.e. the input signal $I(x)$ itself or any functional thereof resulting from filtering the input signal by one or more intermediate filters) and outputting a bandpass signal indicative of low-contrast slowly-varying qualitative features of the face. The low-pass filtering module is configured for receiving data indicative of the input signal (i.e. the input signal $I(x)$ itself or any functional thereof resulting from filtering the input signal by one or more intermediate filters), and outputting a low-pass signal in which low-contrast regions are smoothed, while high-contrast regions are preserved. The feature computation module is configured for receiving the input signal $I(x)$ and calculating a localized feature of the image for a plurality of pixels of the image. The strength computation module is configured for receiving the localized feature resulting from the feature computation module, using the localized feature for determining a localized operand to determine a strength of the filtering modules at the plurality of the pixels, and transmitting the localized operand to the filtering modules. The transformation module is configured for altering at least a portion of at least one of the following signals: high-pass signal, at least one bandpass signal, and low-pass signal. The addition module is configured for receiving the high-pass signal, the at least one bandpass signal, and the low-pass signal after at least a portion of at least one of these signals has been altered by the at least one transformation module, and for adding the received signals together, thus yielding an output signal (image data) indicative of a characteristic of an altered image.

Thus, system 200 receives an input signal $I(x)$ which is to be processed and which is indicative of an image including at least a part of a human face. The system operates to filter the input image data aimed at altering (e.g. improving) the face's image. The input signal $I(x)$ is actually in the form of image data presented by a matrix of pixels and is thus indicative of a characteristic of the image at each pixel. As mentioned above, the characteristic may be intensity or value.

Initially, the input signal is analyzed by the feature computation module f which calculates, for each pixel of the image (having position defined by a row r and a column c), a localized feature $f(r, c)$ of the image. In a non-limiting example, the localized feature may be a gradient of the characteristic of the image, or a local maximum of local gradients. If the characteristic is the intensity, then the gradient of the intensity is larger in the regions in which the contrast is higher. The localized feature $f(r, c)$ is then fed into the strength computation module $FI(x)$, which uses the localized feature and an adaptive operand [a] for the filtering operation to compute a localized operand $F(r, c)$ which controls the strength of the smoothing on each pixel. In general, the localized operand $F(r, c)$ is such that regions with high contrast are finely smoothed, while regions in which the contrast is lower are more coarsely smoothed. As mentioned above, regions of the image in which the contrast is higher are the regions of contours and edges, which generally contribute to the vitality and acuity of the face's image.

The localized operand $F(r, c)$ is fed into the high-pass filtering module, one or more bandpass filtering modules, and the low pass filtering module. In each filtering module, the localized operand $F(r, c)$ is used to calculate a parameter of each of these filters that the respective filtering module will apply on the input image. The filtering modules decompose the input signal into component signals $S1(x)$ to $S5(x)$. In the example of FIG. 2a, $S1(x)$ is a high-pass signal, $S2(x)$, $S3(x)$, and $S4(x)$ are the bandpass signals, and $S5(x)$ is the low-pass signal. The signal $S1(x)$ is a signal which retains the fine detail of the image, i.e. the signal $S1(x)$ is indicative of an image where high-contrast regions are retained, while other regions are attenuated. The output of each bandpass filtering module is a signal indicative of an image in which certain imperfections of the face are retained, while others are smoothed out. Finally, $S5(x)$ is the low-pass (pedestal) signal, which retains the low frequency base signal of the image, but where all the details are blurred.

At least one of the computed signal component $S1(x), \ldots, S5(x)$ is received by a respective transformation module (T1, . . . , T5). Each transformation module may alter the respective component signal via an offset (bias) function, a gain (stretching) function and/or a thresholding function. Optionally, these functions are constant gain functions provided by predetermined operators. Alternatively, these functions are dependent on the signal component, and may be determined via histogram analysis (mean, standard deviation, thresholded levels such as for example tail outlier values, linear and non-linear mappings etc) of the signal components $S1(x), \ldots, S5(x)$. Finally, the transformed component signals are added together by the addition module $\Sigma 5$ to provide an output signal $O(x)$.

In some embodiments of the present invention, the transformation module T1, acting on the high-pass signal $S1(x)$, increases the weight of the signal S1 relative to the other signals. In this manner the output image is characterized by higher vitality, while the facial imperfections are attenuated.

Figure 2B:
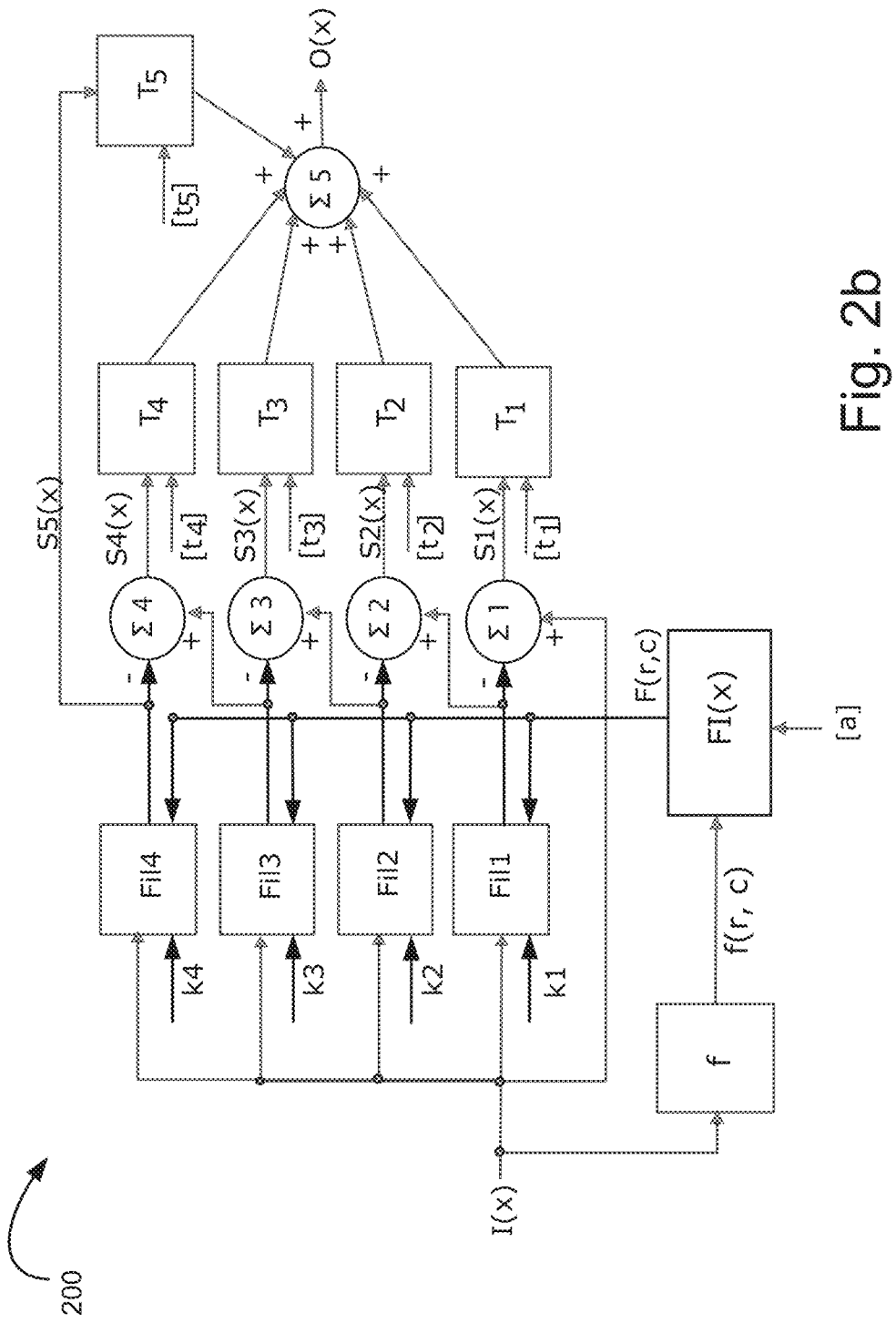
Figure 2C:
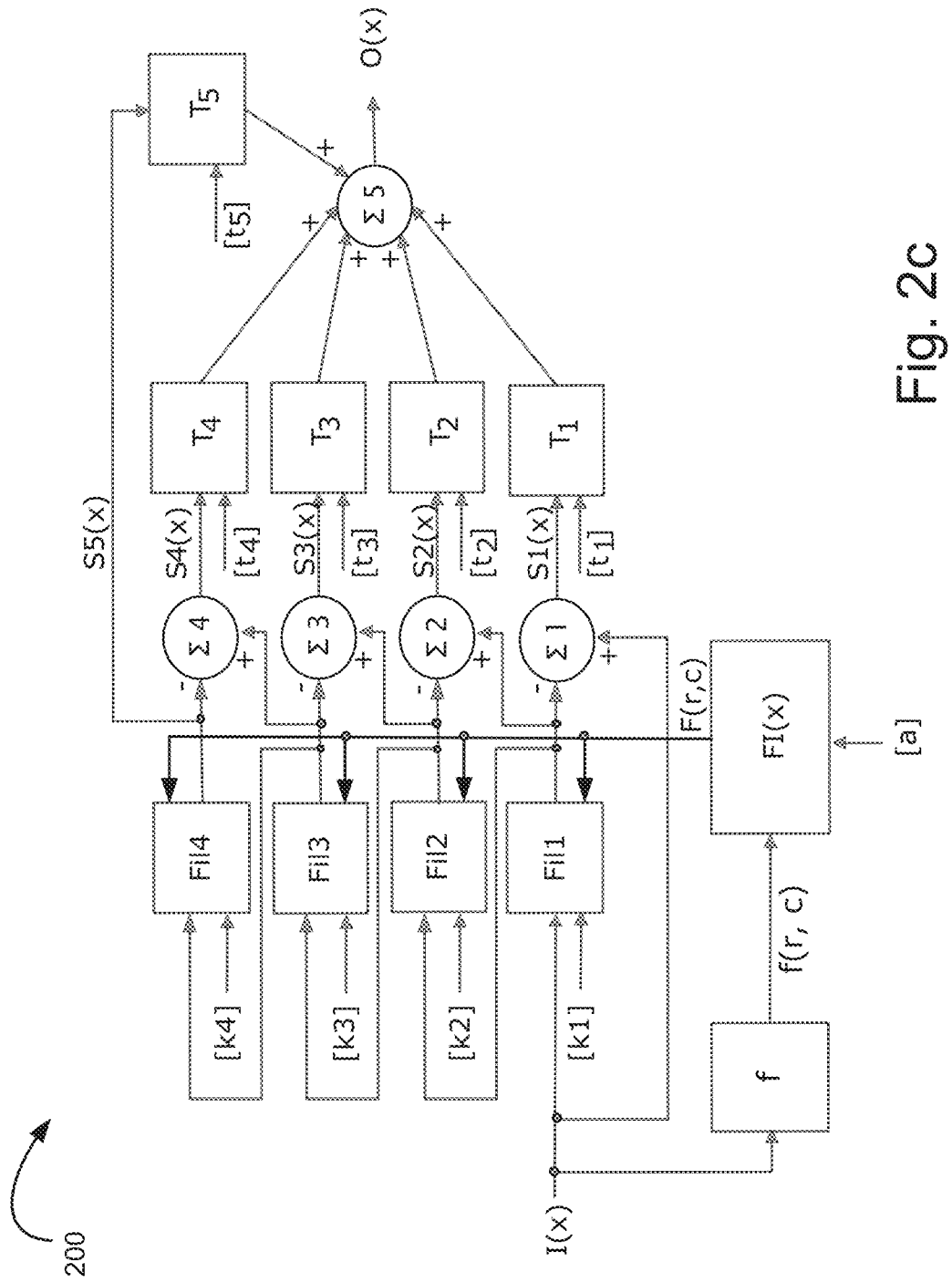
Figure 2D:
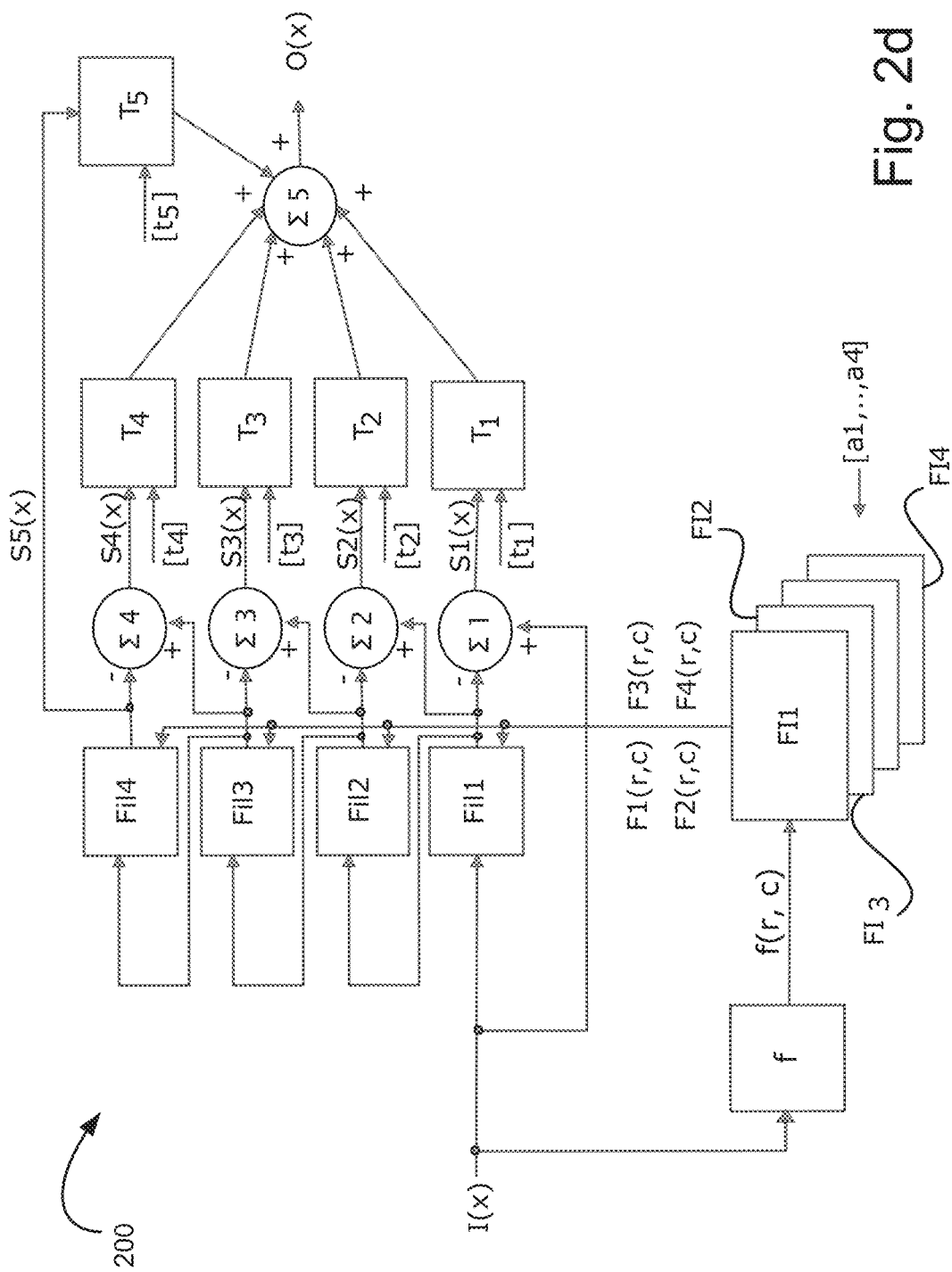

FIGS. 2b-2d illustrate different examples of the system 200 in which the filtering modules of FIG. 2a have different configurations. In these figures, the high-pass filtering module is formed by a smoothing filtering utility Fil1 and a subtractor $\Sigma 1$, which subtracts the output of the first smoothing filtering utility Fil1 from the input signal $I(x)$. Each band-pass filtering module includes the respective smoothing filtering utility and the respective subtractor ($\Sigma 2$, $\Sigma 3$, $\Sigma 4$), which subtracts the output of the respective smoothing filtering utility from the output of a previous smoothing filtering utility forming a previous filtering module. Thus, for example, the module Band-Pass 1 of FIG. 2a includes the filtering utility Fil 2 of FIGS. 2b-2d. The subsequent module Band-Pass 2 of FIG. 2a includes the filtering utility Fil 3 of FIGS. 2b-2d.

Finally, the low-pass filter of FIG. 2a corresponds to the last filtering utility of FIGS. 2b-2d, which is the filtering utility of the last band-pass filtering module. In the non-limiting examples of these figures, the module Low-Pass corresponds to the filtering utility Fil 4.

In FIG. 2b, the localized operand F(r, c) is fed into filtering utilities Fil1, Fil 2, Fil 3, and Fil 4. Each filtering utility is associated with a corresponding individual global parameter (k1, k2, k3, and k4) each being indicative of the strength of the smoothing filter function applied by each of the filtering utilities, and modifying the localized operand F(r, c) to determine the strength of each smoothing filter at each pixel. In other words, all the filtering utilities apply coarser smoothing filters in low-contrast regions and finer smoothing filters in high-contrast regions, because of the localized operand F(r, c). However, the actual strengths of the different filters at a given pixel may be different from each other, since—for each filter—the localized operand is individually modified in a different manner by the respective global parameters (k1, k2, k3, and k4).

As will be shown below, the global parameters, when applied to the operand F(r, c) in each pixel are of lower complexity as compared to the local operands F(r, c). Thus using the global parameter to vary a local operand which is calculated once for each pixel requires less processing than calculating the local operand for each filter, for each pixel. In this manner, the computational process for determining the strengths of the multiple filters at each pixel is accelerated.

In some embodiments of the present invention, the signal I(x) is received by each of the filtering utilities and filtered. In some embodiments of the present invention, the filtering utilities use respective MDAFs and optionally different combinations of non-adaptive finite-impulse-response (NA-FIR) filters and/or adaptive finite-impulse-response (AFIR) filters and/or IIR MDAF, depending on the type of operation or facial image effect desired to separate and process. Because the filters are calculated simultaneously, this embodiment of the present invention enables parallel processing by all filtering utilities, thereby enabling more effective real time implementations with minimum latency in multi processors or multi core processors. Optionally, at least some of the MDAF are IIR MDAF's, and the calculation of the pixel characteristic at each, is performed as described above with reference to FIG. 1a.

In another non-limiting example, in each filtering utility, the MDAF at each pixel depends on a localized feature that applies to all respective directions at that pixel. Thus, it is not necessary to calculate the filtering strength of each ODAF of the MDAF for a plurality of directions. Rather, the localized feature determines a single strength for all the ODAFs which form a specific MDAF at any given pixel.

In one such case, the localized feature f(r, c) is determined by identifying the local maximum of such characteristic of the image within a local region of N pixels' size in the vicinity of said pixel (r,c) (e.g., the maximum in the absolute differences between the intensity at the pixel (r, c) and the intensity of each of the surrounding pixels). In this manner, the localized feature f(r, c) is computed once for all directions of a given pixel, and requires in turn fewer operations and becomes less processor-intensive and thus faster.

In some embodiments of the present invention, successive filtering utilities provide increasingly smoothing (stronger) filters. For example, k1<k2<k3<k4. The output of the first filtering utility Fil1 and the input signal I(x) are received by the first subtracting utility $\Sigma 1$, which subtracts the output of the first filtering utility Fil1 from the input signal I(x). This subtraction forms an adaptive high-pass filter, which yields the component signal $S1(x)=I(x)-MDAF_1(x)$. The signal S1 is a signal which retains the fine detail of the image, i.e. the signal S1 is indicative of an image where high-contrast regions are retained, while other regions are attenuated. Similarly, additional adaptive bandpass (surface) filters may be achieved by additional subtractions effected by additional subtracting utilities $\Sigma 2$, $\Sigma 3$, and $\Sigma 4$. For example, subtracting utility $\Sigma 2$ receives $MDAF_1(x)$ from the filtering utility Fil1 and $MDAF_2(x)$ from the filtering utility Fil2, to yield the component signal $S2(x)=MDAF_1(x)-MDAF_2(x)$. Finally, $S5(x)$ is the low-pass (pedestal) signal component exiting the $MDAF_4$ filter of the filtering utility Fil4. Thus, the output of each bandpass filter is a signal indicative of an image in which certain imperfections of the face are retained, while others are smoothed out. Optionally, utility Fil1 applies a non adaptive FIR (NAFIR) filter, such as a Gaussian smoothing filter, which is effective in preserving edge and contour high frequency image detail in the differenced signal component $S1(x)$.

One or more of the computed signal component $S1(x), \ldots, S5(x)$ is received by a respective transformation modules T1, . . . , T5. The transformation module may alter the respective component signal via an offset (bias) function, a gain (stretching) function and/or a thresholding function. Optionally, these functions are constant gain functions provided by predetermined operators. Alternatively, these functions are dependent on the signal component, and may be determined via histogram analysis (mean, standard deviation, thresholded levels such as for example tail outlier values, linear and non-linear mappings etc) of the signal components $S1(x), \ldots, S5(x)$ signals. Finally, the transformed component signals are added together by the addition module $\Sigma 5$ to provide an output signal $O(x)$.

In some embodiments of the present invention, the transformation module T1 acting on the high-pass signal $S1(x)$ increases the weight of the signal S1 relative to the other signals. In this manner the output image is characterized by higher vitality, while the facial imperfections are attenuated.

In a non-limiting example of the present invention, for each ODAF of the MDAFs the output signal ODAF(r, c) can be expressed as follows:

$$ODAF(r,c)=\alpha(r,c)\cdot I(r,c)+(1-\alpha(r,c))\cdot O(r-i,c-j) \quad \text{eq. 25}$$

The i and j indexes denote the direction of the ODAF in the image, while α(r, c) is the operand that reflects the strength of the specific filter and depends on the local abruptness or edge structure of the pixel (r, c).

As mentioned above, in abrupt pixel change locations (high contrast regions) the ODAF will attempt to smooth less, while in smooth image regions the ODAF will attempt to smooth more.

In a non-limiting example, the adaptive operand α(x) can be expressed as follows:

$$F(r,c)=\exp(-f(r,c)/a) \quad \text{eq. 26}$$

$$\alpha(r,c)=\Phi(F(r,c),k) \text{ where } k \text{ ranges between } 0<k<2 \quad \text{eq. 27}$$

F(r, c) is the feature computed in each image pixel, where a (the adaptive operand input into the strength computation unit FI(x)) is a constant value indicative of a noise level or signal level, depending whether one seeks to overcome noise by adaptive smoothing, or seeks to separate local signal amplitude variation components that represent clutter, image texture of interest etc, Φ(F(r, c), k) is a function of F(r, c) and k, and $$f(r,c)=\max[\text{abs}((I(r,c)-I(r-1,c-1))), \text{abs}((I(r,c)-I(r-1,c))), \text{abs}((I(r,c)-I(r-1,c+1))), \text{abs}((I(r,c)-I(r,c-1))), \text{abs}((I(r,c)-I(r,c+1))), \text{abs}((I(r,c)-I(r+1,c-1))), \text{abs}((I(r,c)-I(r+1,c))), \text{abs}((I(r,c)-I(r+1,c+1)))] \quad \text{eq. 28}$$

over a neighborhood of eight pixels.

While in this example, f(r, c) is calculated in a window composed by nine pixels forming a square, larger and/or differently designed local windows may be used. A non-limiting example of a window is a window oriented in various directions such as vertical, horizontal, and +45 degrees and −45 degrees orientations, whereby gradients are summed separately for each orientation and the orientation which generates the maximum value is selected for f(r,c) for that pixel in best estimating the edge feature.

The computed f(r,c) value and the a value are used in determining the exponential function F(r,c)=exp(−f(r,c)/a). This function is typically computationally expensive, and may be performed once for all possible values of −f(r,c)/a, which are then optionally loaded onto a lookup table (LUT). Next, for each of the filters in FIG. 2b Fil1, Fil2, Fil3, Fil4, the respective F1(r,c), F2(r,c), F3(r,c), F4(r,c) (and thus the respective α1(r,c), α2(r,c), α3(r,c), α4(r,c)) values are determined using a preferred piecewise linear transformation that requires far less complexity than recalculating the exponential function for each pixel and each filter. For a certain α1(r,c), this transformation is computed as follows (and similarly for the other filters as well):

| |
|---|
| If (F(r,c) < 0.5) |
|     F1(r,c) = k1·F(r, c)      eq. 29 |
|     α1(r,c) = 1 − F1(r, c)      eq. 30 |
| Else |
|     F1(r, c) = Φ|(F (r, c),k) = (2−k1) · F(r,c) + k1 − 1    eq. 31 |
|     α1(r, c) = 1− F1(r, c)      eq. 32 |
| for k values ranging between 0 < k < 2 |

Thus, when k is below 1, the adaptive filter acts as a "finer" filter, which tracks the incoming signal edges more rapidly and smoothes them less. If k is above 1, the adaptive filter functions as a "coarser" filter, which tracks the incoming signal edges less rapidly and smoothes more. Thus, for all filters and all pixels, the adaptive smoothing operands α1(r,c), α2(r,c), α3(r,c), α4(r,c)) are determined and used in determining the respective ODAFs and respective MDAFs:

$$ODAF1(r,c)=\alpha1(r,c)\cdot I(r,c)+(1-\alpha1(r,c))\cdot O(r-i,c-j) \quad \text{eq. 33}$$

$$ODAF2(r,c)=\alpha2(r,c)\cdot I(r,c)+(1-\alpha2(r,c))\cdot O(r-i,c-j) \quad \text{eq. 34}$$

$$ODAF3(r,c)=\alpha3(r,c)\cdot I(r,c)+(1-\alpha3(r,c))\cdot O(r-i,c-j) \quad \text{eq. 35}$$

$$ODAF4(r,c)=\alpha4(r,c)\cdot I(r,c)+(1-\alpha4(r,c))\cdot O(r-i,c-j) \quad \text{eq. 36}$$

In another embodiment of the present invention, the localized feature F(r, c) is designed such that at pixels with abs(f(r,c))<a the α(r,c) will be small thereby filtering more strongly, and when abs(f(r,c))>a the α(r,c) will be higher thereby filtering less strongly, thereby providing a more abrupt adaptation of the α(r,c) parameter depending on whether f(r,c) values are well below a or above a. An example of such feature is as follows:

$$F(r,c)=(\text{abs } f(r,c)^m/(\text{abs } f(r,c)^m+d^m))=(1+(a/\text{abs}(f(r,c)))^m) \quad \text{eq. 37}$$

$$a(r,c)=F(r,c) \quad \text{eq. 38}$$

where a and f(r,c) are as provided above, and m is a slope factor of said function within the range between 0 and a. The advantage of this function in the context of facial image improvement is that it will smooth more strongly the subtle facial imperfections while retaining more effectively the sharpness of stronger detail. For this embodiment, each of the filters receives increasing a factors, thus shifting the smooth transition range of the respective filter to higher values of f(r, c) than the preceding one hence making the respective filter to smooth stronger.

In another non-limiting example, well-known gradient operators and edge detection filters may be used to score pixels in terms of their "edginess" (e.g. a Sobel filter, which is often used in edge detection), and use this measure to control α(x). Image segmentation techniques may also be used to segment local image regions, thereby determining the transition pixels between such adjoining areas, and avoiding their smoothing.

Referring now to FIG. 2c, another example of the system 200 of the present invention is illustrated, in which the filtering units are in series. In the system of FIG. 2c, the filtering modules are arranged in series. Thus, except for the last filtering module, the output of any filtering module is filtered by a successive filtering module. The bandpass filters and the low pass filter are implemented by applying a subsequent filter to the output of the preceding filter, and thereafter differencing them. Like the example of FIG. 2b, the adaptive high-pass component signal is $S1(x)=I(x)-MDAF_1(x)$. The adaptive bandpass (surface) component signals differ from those of FIG. 2b. For example, $$S2(x)=MDAF_1(x)-MDAF_2(MDAF_1(x)) \quad \text{eq. 39}$$

The low-pass (base) component signal exiting the filtering unit Fil4 is:

$$S5(x)=MDAF_4(MDAF_3(MDAF_2(MDAF_1(4)))) \quad \text{eq. 40}$$

The configuration exemplified in FIG. 2c enables pipeline processing of all MDAF filters, enabling effective real time implementations with multi processors or multi core processors. This configuration, however, may be riddled by some latency. Nonetheless an advantage of the embodiment of FIG. 2c lies in the fact that the k values may be selected according to need and application, and need not be ordered in increasing values.

Referring now to FIG. 2d, another example of the system 200 of the present invention is illustrated, in which each filter of the filtering modules depends on a respective localized feature. The localized features (F1(r, c), F2(r, c), F3(r, c), F4(r, c)) are computed individually for each filter, according to desired signal characteristics that are to be extracted using the respective differenced signal components S1(x), S2(x), S3(x) and S4(x). In such cases, both the F(r,c) function as well as the factoring function Φ(F(r,c),k) may be tailored per S(x) signal component, and are calculated outside the filtering utilities Fil1-Fil14.

It should be noted that while in the examples of FIGS. 2b, 2c, and 2d, four filtering utilities are present, the scope of the invention is not limited to this example as well as any other number of filtering utilities, and generally two or more filtering utilities may be used. Moreover, the filtering utilities of the above examples applied at least one MDAF to the received signals. This might not be the case. In fact, in some embodiments the filters implemented by the filtering utilities may include MDAFs, and/or MDAIIRs and/or NAFIRs, AFIRs etc, depending on the type of operation or image effect desired to separate and process. For example, the filter $MDAF_1$ applied by the filtering utility Fil1 may be replaced by a linear filter such as a Gaussian or a box filter, such that the S1(x) signal is a linear high-pass component signal.

As indicated above, the elements (modules/utilities) of the system 200 may be implemented as hardware and/or software elements of a data processing and analyzing utility running respective algorithms on a processor.

For FIG. 2b, the output O(x) is denoted by:

$$O(x)=T5[Fil4]+T4[Fil3-Fil4]+T3[Fil2-Fil3]+T2[Fil1-Fil2]+T1[I-Fil1] \quad \text{eq. 41}$$

For FIGS. 2c and 2d, the O(x) is denoted by:

$$O(x)=T5[Fil4(Fil3(Fil2(Fil1)))]+T4[Fil3(Fil2(Fil1))-Fil4(Fil3(Fil2(Fil1)))]+T3[Fil2(Fil1)-Fil3(Fil2(Fil1))]+T2[Fil1-Fil2(Fil1)]+T1[I-Fil1] \quad \text{eq. 42}$$

In both cases, when all T transformations are unity (i.e. transparent), the result is O(x)=I(x). Thus the transformation of at least one of the component signals is necessary in order to alter the input image.

In order to better understand the operation of the system 200, reference is made to FIGS. 3a-3f, 4a-4c, and 5a-5c which illustrate examples of the manner in which an input signal is processed by the different modules/utilities of the system 200 of the present invention. In the example of these figures, a system 200 with two smoothing filtering utilities is considered.

FIG. 3a illustrates a facial image signal profile example of the intensity (i) of an input image I as a function of the position along an axis (x) of the image. In the input image, the region A between the points x1 and x2 is a substantially flat region, which is typically affected by camera noise and/or varying background texture. The region B between points x2 and x3 is a transition region between background and a facial skin area having a relatively high contrast (difference in luminance between adjacent pixels), between an adjoining background pixel and a facial skin pixel. Generally in imaging, such transition region typically corresponds to an edge or contour of an imaged object. The region C between points x3 and x4 is a relatively flat skin region typically affected by a superposition of camera noise and a rapidly varying (high frequency) skin texture (e.g. wrinkle). The region D between points x4 and x5 is a skin region typically affected by a superposition of camera noise and slowly varying (midrange frequency) skin texture (e.g. shaded skin fold, sagging skin). The region E between points x5 and x6 is a skin region typically affected by a superposition of camera noise and structured skin texture (e.g. blemish, acne, lesion). The region F between points x6 and x7 is again a relatively flat skin region typically affected by a superposition of camera noise and skin texture (e.g. pores).

FIG. 3b illustrates the "intensity vs. position" plot along the x axis of an image outputted after applying a fine smoothing filter such as for example a NAFIR (or an adaptive FIR (AFIR) filter) to the Input I. A fine smoothing NAFIR filter may be for example a Gaussian weighted filter (standard deviation radius ranging between ~0.5-2 pixels). The output I1 of the NAFIR filter is designed such that when performing the subtraction operation I−I1=(I−NAFIR(I)) as depicted in FIG. 3c, the edge/contour transitions and high frequency noise and wrinkle texture are preserved.

FIG. 3d illustrates the "intensity vs. position" plot along the x axis of an image outputted after applying a coarse multi directional adaptive IIR (MDAIIR) smoothing filter to the NAFIR filtered output (as described above, with reference to FIGS. 2c and 2d) The output I2 of the MDAIIR filter is designed such that when performing the subtraction operation I1−I2=(FIR(I)−MDAIIR(FIR(I))) as depicted in FIG. 3e, the low-contrast slowly-varying skin textures are extracted (e.g. shaded skin fold, sagging skin, blemishes, acne, lesions), while high-contrast is attenuated.

A general mathematical notation of the above hybrid (i.e. combined filtered FIR and IIR) image representation is as follows:

$$O=T3[I2]+T2[I1-I2]+T1[I-I1] \quad \text{eq. 43}$$

where O is the output signal, and T3, T2 and T1 are the gain or look-up table (LUT) transformations applied to the low-pass (pedestal) signal component [I2] and the signal difference components [I1−I2] and [I−I1], respectively.

By applying appropriate transformations to the component signals, the output signal can be adjusted according to the user's need. In FIG. 3f, the output signal O (indicative of an output image) is illustrated, and compared to the input signal I. It can be seen that the addition of the transformed component signals yields an output signal in which the noise is smoothed out in regions A and F, the facial imperfections are smoothed out in regions C to E, while the high-contrast region B (possibly indicative of a contour or edge of the face or of a face's feature) is retained and even enhanced.

FIGS. 4a-4c are curves which illustrate the behavior of the transformations T3, T2, and T1 respectively applied to the low-pass component signal I2 described in FIGS. 3c-3e, the bandpass component signal [I1−I2], and to the high-pass component signal [I−I1]. When the slopes of the curves are smaller than 45 degrees, the transformations attenuate (reduce the amplitudes) their respective signals. When the slopes of the curves are greater than 45 degrees, the transformations increase the amplitude of their respective signals.

FIG. 4a illustrates a transformation T3 applied to the low-pass pedestal signal I2, and serves in controlling the dynamic range of the output image, whereby such intensity mapping provides respective offsets and stretching. T3 typically attenuates the portions of the signal I2 where the signal amplitude is below a first threshold and over a second threshold, while it increases the amplitude of the signals which are in a range between the two thresholds. Thus, the transformation T3 results in the control of the displayed amplitude of the region B, where contrast is highest, while it attenuates the extreme low and high value signals (near zero/cutoff and near saturation). In this manner, the vitality/acuity of the image is retained, while avoiding driving the outlier signals into further cutoff and saturation resulting in loss of image detail information and undesirable image display effects. Such mapping may be designed as a function of the histogram of the values of I2.

FIG. 4b illustrates an exemplary transformation T2 applied to the difference component signal [I1−I2] that comprises low contrast slowly varying skin textures (e.g. shaded skin fold, sagging skin, blemishes, acne, lesions). In example a, the mapping function reduces all amplitudes by a constant, since the plot is linear and the slope is below 45 degrees. In example b, the amplitude of the component signal [I1−I2] is both reduced and reversed thereby resulting in a yet a more significant skin texture imperfection reduction.

FIG. 4c illustrates a transformation T1 applied to the difference signal component [I−I1] that comprises edge/contour transitions and high frequency noise and wrinkle texture data. A non-linear mapping is preferably used in reducing the noise and fine wrinkle data while retaining and even amplifying the higher amplitudes of the edges and contours.

Additional smoothing filters and respective differencing operations may be applied on the output of the first filtering utility if additional skin effects need to be extracted and further processed. For example, when adding another smoothing filter, the notation is as follows:

$$O=T4[I3]+T3[I2-I3]+T2[I1-I2]+T1[I-I1] \qquad \text{eq. 44}$$

Figure 5A:
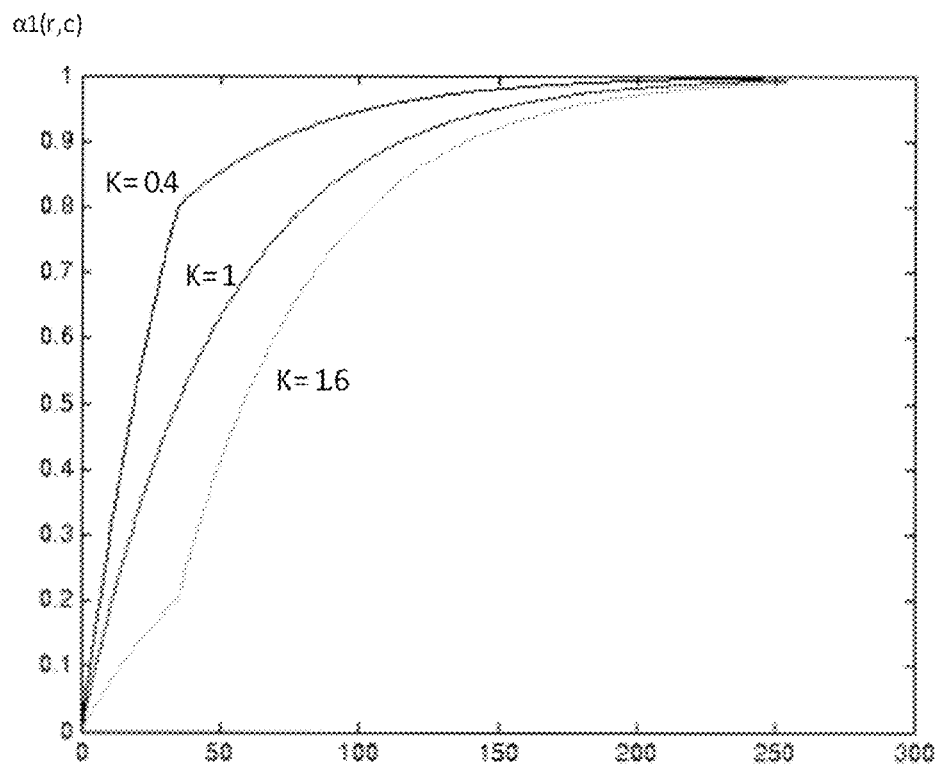
Figure 5B:
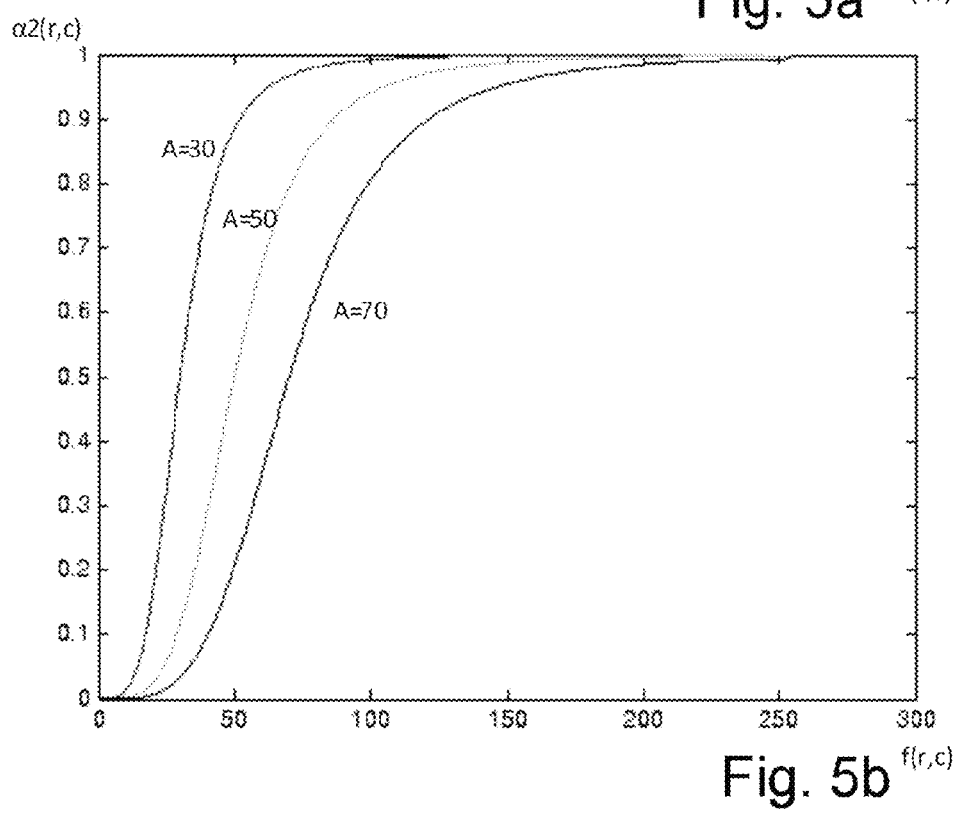

FIGS. 5a-5c are plots which illustrate non-limiting examples of filters applied by the smoothing filtering utilities of the system 200 on respective received signals as a function of the feature F(r, c).

In FIG. 5a, α1 is calculated according to equations 29-32 above. α1(r, c) is plotted against (f(r,c)/a) for a=30, and three values of k, namely k=0.4, 1 and 1.6. For the same value of f(r, c), the value of α1(r, c) decreases as k increases. Thus the respective filter α characteristic as a function of f(r, c) becomes steeper and generally assumes higher values (finer filtering, more sensitive to abrupt transition contours) for low values of k, and becomes less steep and generally assumes lower values (coarser filtering, more sensitive to non-abrupt smoother subtle transitions between adjoining regions) for high values of k.

In FIG. 5b, α2 is calculated according to equations 37 and 38 above.

α2(r, c) is plotted against (f(r,c)/a) for the values of m=4 and values a=30, 50, 70. Note that in the α2(r,c) embodiment the respective filtering strengths of the filters is a function of the respective values a1, . . . , a4, while in the α1(r,c) embodiment the respective filtering strengths of the filters is a function of the respective values k1, . . . , k4 and requires the additional per-pixel, per-filter computations related to said k piecewise transformation.

An additional advantage of α2(r, c) compared to α1(r, c) is illustrated in FIG. 5c. It can be seen that α2(r, c) is higher than α1(r, c) at high values of f(r, c) (corresponding to high values of contrast), and thus retains details in the edge and contour transition locations. On the other hand, α2(r, c) is lower than α1(r, c) at lower values of f(r, c) (corresponding to smoother, lower contrast and more subtle values of contrast), and thus smoothes such regions more strongly.

Referring now to FIG. 6a-6d, block diagrams illustrate some examples of a system 300 for processing an image of a human face, according to another embodiment of the invention. In the system 300 the input image is processed along two different paths, and the outputs of the two processing paths are combined to yield an output image. The first path generally includes a linear filter, while the second path includes the above-described system 200.

Figure 6A:
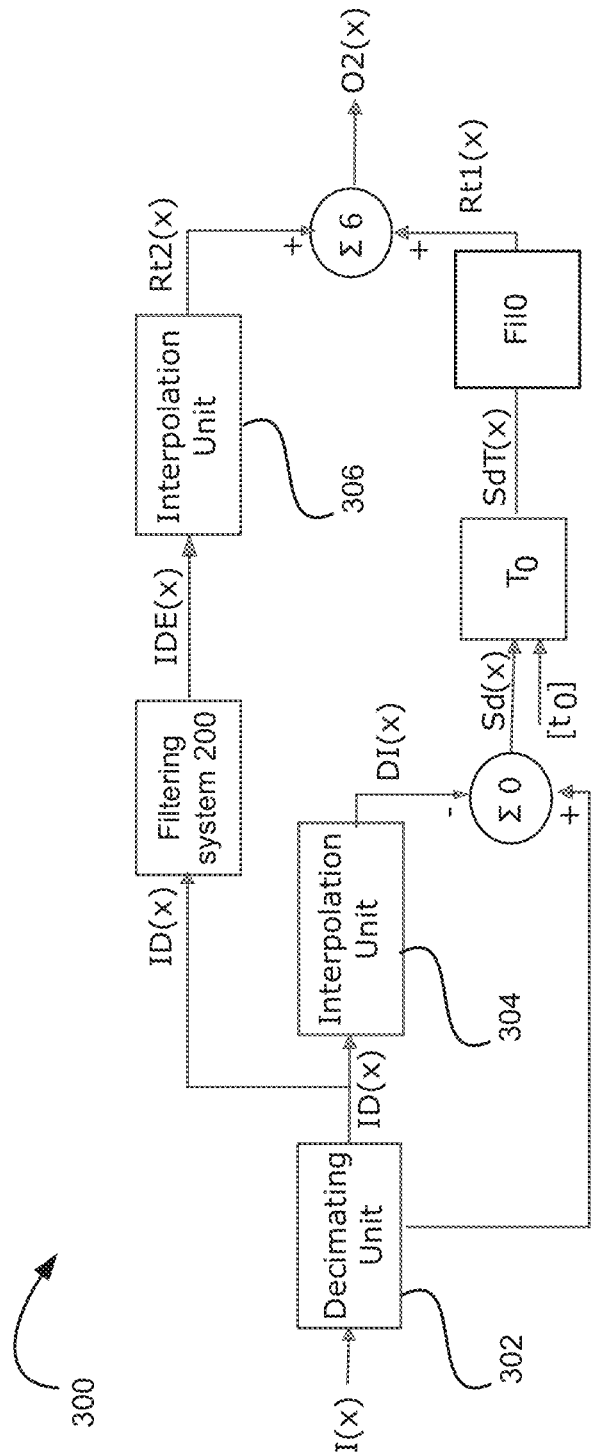

In FIG. 6a, the signal I(x) indicative of the input image is received by a decimating unit 302, which reduces the size of the image, and thus removes a portion of the data contained in the signal I(x), to output the decimated signal ID(x) indicative of a decimated image. The decimated signal is then processed in two different threads/routes.

In the first thread, an interpolation unit 304 is used to increase decimated image to the input image original size by interpolation. Thus, the signal DI(x) outputted by the interpolation unit 304 is indicative of an interpolated image having the size of the input image. In the interpolated image, the characteristic (value or intensity) of the pixels where the missing data was previously located is interpolated according to the characteristic of the surrounding pixels. Thus, the decimation and interpolation of the input image results in a smoothed image. The interpolated signal DI(x) and the input signal I(x) are received by a subtracting module Σ0, where DI(x) is subtracted from I(x) to produce a difference signal Sd(x). Optionally, the difference signal passes through the transformation module T0, which applies a transformation thereon (similar to the transformation modules described above), and outputs as the transformed difference signal SdT(x).

In the second thread, the decimated signal ID(x) is processed by the system 200 described above with reference to any one of FIGS. 2a to 2d, producing a resulting signal IDE(x) which corresponds to the signal O(x). The signal IDE(x) is then interpolated by a second interpolating module 306, thus yielding the interpolated signal Rt2(x) indicative of an image having the same size as the input image. Optionally, the signal Sdt(x) from the first thread is summed with the signal Rt2(x) from the second thread by an addition module Σ6 resulting in the output signal O2(x), which can be converted into an output image. Alternatively, the signal Sdt(x) may be further processed by a filtering utility Fil0 such as a MDAIIR, thereby further reducing residual noise in the detail signal component, and the signal Rt1(x) is yielded. In the latter case, the signal Rt1(x) is summed with the signal Rt1(x) by the addition module Σ6 resulting in the output signal O2(x).

The decimation (down sampling) and interpolation (up sampling) by the decimating modules 302 and the interpolating modules 304 and 306 may be bilinear or of a higher order.

In the system 300, the first thread produces the signal SdT(x) (or Rt1(x)) which is generally indicative of the details (contours, edges) of the face while attenuating the rest of the image. This is because the signal Sd(x) (from which the signals SdT(x) and Rt1(x) derive) is a difference between data indicative of the input image and data indicative of a smoothed image, thus being a high-pass signal. Thus, the first thread is a high-pass filter. In the second thread, the facial information to be retouched is processed. Thus, in the system 300, detail information is processed differently from the facial information to be retouched, and the output signal therefore retains the acuity that may be otherwise lost in the retouching process of the second thread.

The system 300 may provide processing acceleration as (a) the intensive processing of the system 200 is applied to a smaller image, and (b) image resizing operations (e.g. decimators and interpolators) are implemented in advanced processors (e.g. multi core digital signal processors (DSPs)) in real-time accelerated (e.g. dedicated hardware) configurations, thereby enabling more complex operations to be handled by software-based DSP cores of said processors. At the same time, the details of the image are still maintained (and may even be accentuated via the transformation module T0), thanks to the processing along the first thread.

The signal component Sd(x) that contains image detail may also be extracted effectively in another embodiment using a simple high pass NAFIR filter module 310 as provided in FIG. 6b, without decimating and interpolating in the first thread. Yet another embodiment of the present invention is exemplified in FIG. 6c, wherein a simple low pass NAFIR filter module 312 is used for both (a) generating the high pass detail filter by the differencing operation in the first thread, and (b) for achieving said decimation operation by an additional sub sampling unit 314 in the second thread.

Figure 6D:
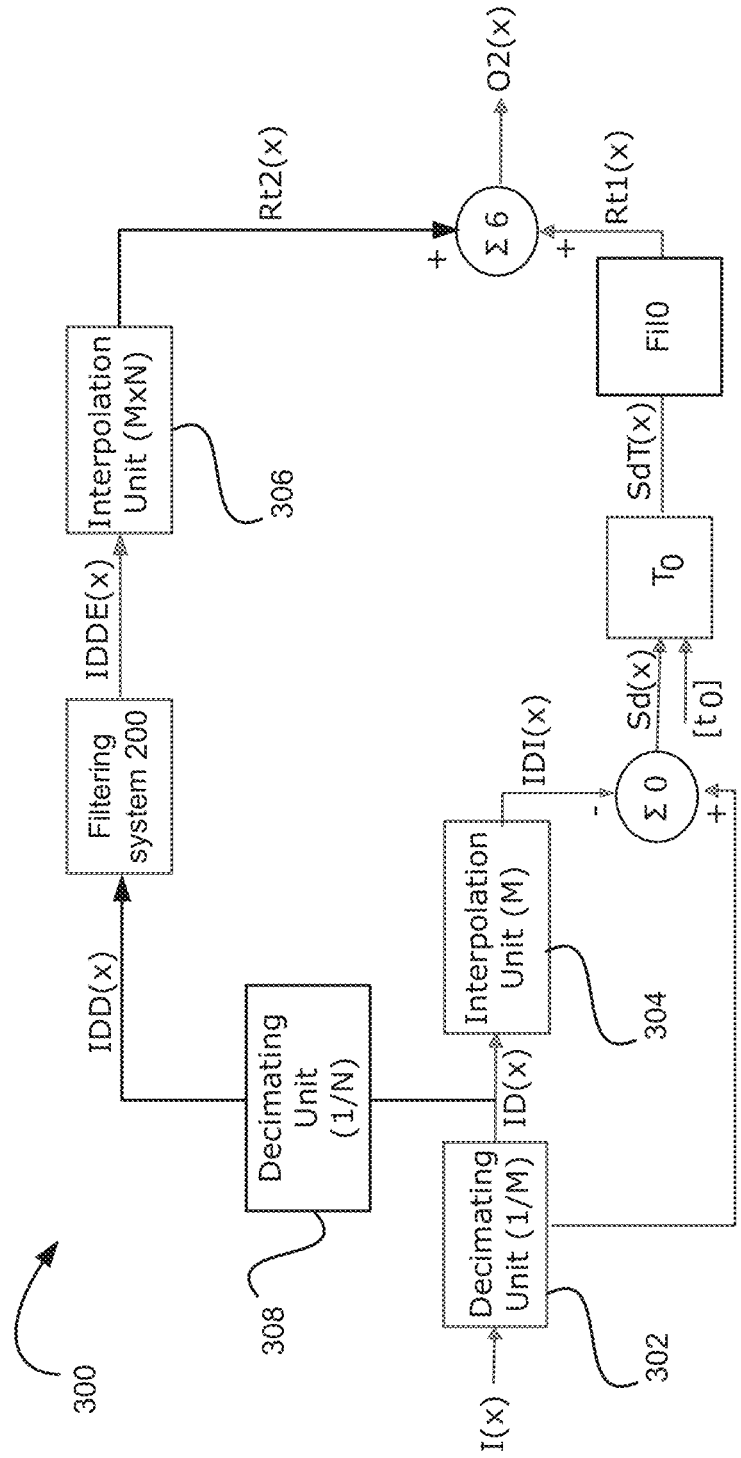

Referring now to FIG. 6d, a block diagram illustrates yet another example of the configuration and operation of the system 300, in which the input image undergoes two decimations. The system 300 of FIG. 6d is configured similar to that of the example of FIG. 6a. In fact, the first thread of FIG. 6d is the same as the first thread of FIG. 6a, in which the image signal is decimated by a factor M and is then interpolated by the same factor M. However, the second thread of the system in the example of FIG. 6d includes an additional decimating module 308, which further decimates the signal ID(x) by a factor N, to produce the decimated signal IDD(x). The signal IDD(x) is processed by the thread/path including the above-described system 200 to produce the signal IDDE(x) and an second interpolation module 306 which interpolates the signal IDDE by a factor M×N to produce the signal Rt1(x), which is to be summed to SdT(x) or Rt1(x) to yield O2(x).

An advantage of this example of FIG. 6d is in that the decimation factors M and N may be determined according to the specific application or situation. The M factor determines the detail (e.g. edge and contour) information that is preserved and further processed in the first route. Facial image detail and acuity to be preserved is typically characterized by higher contrast and abrupt transitions (i.e. narrow transition regions). This can be extracted by a small decimation/interpolation (DECINT) factor M ranging typically between 1.1<M<2, or alternatively by a small high pass filter based on a NAFIR Gaussian filter with Gaussian Radius (GR) ranging typically between 0.5<GR<1. As found by the inventors, facial skin imperfections to be concealed and removed are typically characterized by lower contrast and slower transitions between skin regions that look good and skin regions that are affected by the variety of said imperfections. Therefore a significant portion of the imperfections' signals are effectively processed by the second thread/route and not retained in the first one.

Because facial image acuity and detail is retained in the first thread, the processing strength of the second thread can be increased with reduced potential loss of image acuity as a function of the actual facial imperfections of the particular subject, illumination conditions, etc. The decimation factor N may typically vary between 2<N<4. Moreover, the decimation factor N may be determined by the processing resources available in a given application and processor. If such processing resources are low, then the factor N may be increased to the point where the process runs at real time. This feature is particularly useful in processing platforms that provide such hardware/software accelerated solutions for said resizing (decimation and interpolation) operations.

Another consideration that may impact the selection of the decimation and interpolation factors (or the highpass NAFIR alternative) of the first route is the input image resolution as compared to the resolution of the display. Often in video transmission applications (e.g. video calling, video conferencing), bandwidth limitations constrain the amount of compressed image data that may be transmitted, in which cases the compression codecs may dynamically reduce the transmitted image resolution before reducing the video frame rates. Three image formats that are typically used in video calling applications include 640×480 pixels, 320×240 pixels and 160×120 pixels. Assuming, for example, a display resolution at the receiving end of 1280×960, typically the received imagery is resized dynamically to fit the display screen, such that the size of the displayed subject and displayed scene in such video calling applications remains constant regardless of the dynamically-selected transmitted image resolution.

In any such case where an image is enlarged for display (e.g. via interpolation), respective image pixels are enlarged, and aliasing (the effect in which different signals become indistinguishable) may be observed. In the embodiments of FIGS. 6a-6d utilizing the first route (detail) and the second route (concealing) processing, the retained detail signal component from the first route when enlarged for display may accentuate such aliasing effects in the vicinity of edges and contours. This effect may be amplified as the display enlargement increases. Therefore, for example, for a transmitted image of size 640×480 pixels and a display of size 1280×960 pixels, the enlargement factor is small (2×2) and the processing may use a higher decimation and interpolation factor, such as 4 (referring to FIG. 6a). This also alleviates the processing resources of the filtering system. As the transmitted image size is reduced to 320×240 pixels, the enlargement factor increases (4×4), and the processing should use a lower decimation and interpolation factor, such as a factor of 2 (referring to FIG. 6a), thereby avoiding excessive accentuation of display aliasing, and building on the reduced processing resources required for the filtering system due to the smaller image size. As the transmitted image size is further reduced to 160×120 pixels, the enlargement factor increases (8×8), and the processing should use no resizing at all, thereby avoiding excessive accentuation of display aliasing, and building on the further reduced processing resources required for the filtering system due to the further reduced image size. Therefore, in some embodiments of the present invention there is provided a logic/control utility for controlling such decimation and interpolation factors as a function of transmitted image size, display size, and computing resources. The logic utility may be part of the decimating module or of the interpolation module, or the logic utility software may be distributed between the decimating module and interpolation modules.

The embodiment in which decimation is performed in two stages using factors M and N (referring to FIG. 6d) may be particularly useful in situations of high resolution imagery, whereby the first route decimation and interpolation factor M is selected such that sufficient image detail is preserved, while sufficient facial skin effects are retained in the second route for further processing and concealing. Because the retaining of image detail requires relatively small NAFIR filters, the first route factor M can be chosen to be substantially low. On the other hand, the second route includes more complex processing. Thus, the factor N of the second route is selected according to available processing resources. In this manner, the first route's processes are optimized separately from the second route's processes, such that each route affects a different aspect of the displayed facial image (namely, the first route affects detail, while the second route affects skin effects). This embodiment can also be implemented with two NAFIR low pass filters and a sub-sampling function as in FIG. 6c, whereby a small NAFIR is used for the first route and an additional larger NAFIR is used before or after said sub-sampling function in second route. Thus, in some examples, the system includes the logic utility as provided above for controlling such decimation and interpolation factors as a function of transmitted image size, display size, and computing resources.

It should be noted that the above imaging processing systems may operate in various color representations, for example RGB, YCbCr, Lab etc. Thus, the technique of the present invention can be applied to imaging systems which capture and display color video in RGB color representation, and to other imaging systems which capture and display color video in YCbCr with varying color resolutions (e.g. 4:2:2, 4:2:0).

In the context of DM, the operation of the system of the present invention (e.g. systems 200 and 300 as provided in the above figures) is designed to imitate the way makeup artists work. Generally, a makeup process comprises five main steps: Foundation, Concealer, Liner, Blush and Powder.

In DM, Foundation includes evening out skin texture by applying a transparent foundation substance on the entire face thereby creating a canvas, namely a flat, homogeneous, whitish surface of the entire face area, on which all subsequent steps are applied. This is somewhat similar to a painter starting a work of art from a flat white canvas. The component signal $S5(x)$ in any of FIGS. 2a to 2d replaces the Foundation step in DM, as the signal $S5(x)$ is indicative of an image of a smooth, relatively homogeneous surface that generally retains its average color values.

In DM, Concealer includes local application of a skin color-matched concealing substance that covers local skin imperfections and irregularities such as pimples, acne, inflammations, areas of redness or discoloration, pores, birthmarks, blemishes, freckles, wrinkles, creases, spider veins, dark circles under the eye, green-blue areas surrounding the lips etc. Each of these irregularities may require a different covering action, such as the spreading of the concealer in directions that best blend the concealed effect with neighboring regular skin areas. For example, dark circles under the eye are typically concealed by applying concealer on the general area and then spreading the material in multiple directions to the sides and downwards (but not upwards onto the eyes), followed by spreading the concealer in opposite directions until evening out and achieving a desired blend. The transformation of the signal components $S2(x), \ldots, S4(x)$ in FIGS. 2b, 2c, 2d replaces the Concealer elements application in DM, as different regions in the image may be applied with different concealers.

In DM, Liner includes accentuating contours and edges of such facial features as lips and eyes, thereby increasing the facial vitality. A liner seeks facial edges and contours and further enhances them. According to the present invention, such edges and contours are retained and further accentuated by signal component $S1(x)$ in FIGS. 2b, 2c, 2d, and the first route in FIGS. 6a-6d.

In DM, Blush includes adding color and vitality to the face, either over local areas or over the entire face or the entire image. Locally adding blush is achieved by sensing image areas of slight color variations and enhancing them, and/or implementing a global non-linear color histogram transformation operation applied to color image components thereby enhancing the image color saturation that affects mostly the facial areas. For example, in an embodiments of FIGS. 2b, 2c, 2d, with three filtering utilities implementing MDAFs, the $S2(x)$ and/or $S3(x)$ component signals may represent respective colors differences of the input image (e.g. Cb and Cr, being the blue difference and red difference components respectively in a YCbCr color space). The transforming modules T2 and/or T3 amplify the specific color components in the respective signals according to the desired effect to be achieved on the output image. The transformations may be dependent on the Luminance (Y) and chrominance of the $S2(x)$ and/or $S3(x)$ image components. For example, the filtering utilities may operate to decrease luminance and increase chrominance, thus adding color to the input facial image.

In DM, Powder application step includes adding a matte powder over the entire face, or over specific areas of the face or head that generate increased shining that often depends on the illumination conditions and angles. The embodiments of FIGS. 2a to 2d may provide a shining area detection, for example, with three filtering utilities implementing MDAFs where the $S3(x)$ signal representing the luminance component (e.g. Y in a YCbCr color space) would be thresholded by undergoing transformation by module T3. The luminance (pedestal) component $S4(x)$ is thresholded at its saturation level by transformation module T4, and the thresholded regions of the signal $S3(x)$ are correlated with the thresholded regions of $S4(x)$. The regions in which saturation occurs in the thresholded $S4(x)$ signal and the saturation threshold is exceeded in the signal $S3(x)$ are designated as highlighted regions, and their highlighting may be reduced by attenuation via the transformation module T3 and/or the transformation module T4.

In DM, Morphology includes restructuring the face, if needed, by applying shading and highlighting to specific areas of the face. Dark colors (shaders) shade and make areas recede, such as for example hollows of the cheek, temples, under chin and sides of nose. Light colors (highlighters) make things come forward, for example apple of the cheek, under the eye, browbone and middle of the chin. Improved facial morphology and construction using makeup is achieved by typically applying highlights and shadows to specific facial locations. For this, a facial feature detection and/or facial skin detection/segmentation operation is required, as such highlights and shadows are to be placed in specific positions with respect to such facial features (e.g. eyes, brows, lips, nose, chin, cheeks, cheek bones, forehead etc). Such face detection and skin segmentation is required in cases the DM process is to be applied solely to facial regions and not to any background regions. The present invention does not require such face detection and skin segmentation for its operation, although it may use such segmentation for further improvements in some imaging cases.

The facial skin segmentation into component signals provided above may also be used in conjunction with various facial image detection and tracking in imagery, as well as facial morphology analysis for improved shading and highlighting, facial skin tone analysis and respective image display optimization based on such analysis.

Figure 7A:
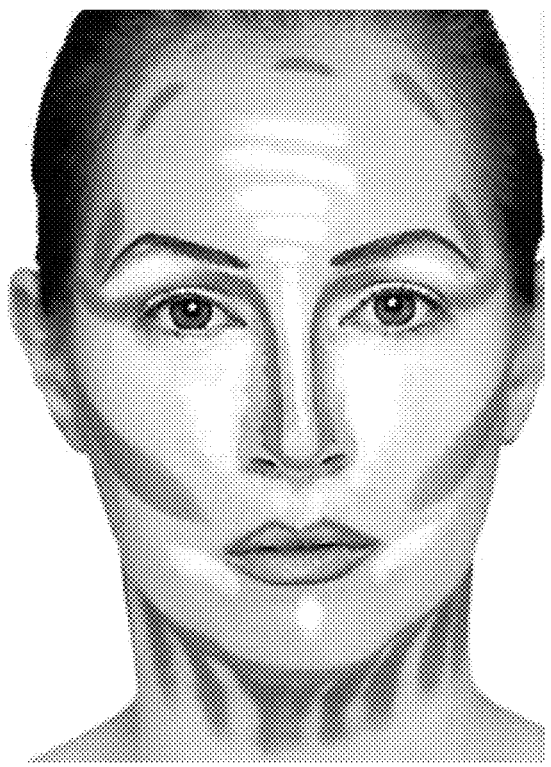
FIG. 7a-7b are drawings depicting specific regions of the face and head that often need shading and highlighting, and the implementation of the shading and highlighting via the technique of the present invention.
Figure 7B:
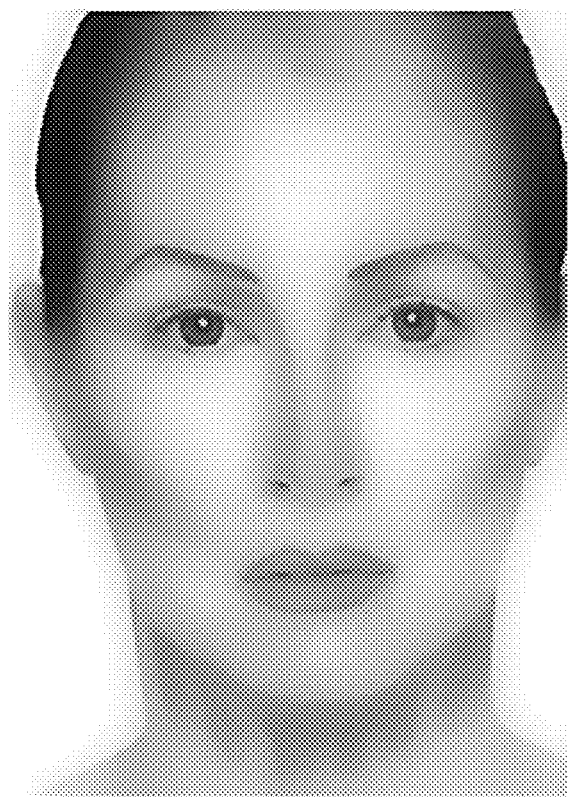

Reference is made to FIG. 7a-7b which depict specific regions of the face and head that often need shading and highlighting. FIG. 7a illustrates specific placement of such shading and highlighting by a professional makeup artist which then blends the substance with surrounding skin. The result of blending in digital makeup according to the present invention is illustrated in FIG. 7b. According to some embodiments of the present invention, automated face and head analysis is performed in order to determine the regions which need shading and highlighting for improved morphology and facial structuring, and the DM techniques described above are performed for each specific region separately. The application of the DM techniques described above will thus depend on whether the region is to be shaded or highlighted.

Referring to FIGS. 8a-8d and 9a-9c, there are provided examples of the present invention, in which the DM processing described above is performed via video compression utilizing various codecs, and video transmission utilizing various networks and platforms, such as desktop and mobile video calling applications over the internet, Wi-Fi and cellular networks Video codecs (e.g. H264, VP8, MPEG2, MPEG4) used in video communications are often equipped with pre-processors for noise reduction and post-processors for compression artifact removal.

Figure 8A:
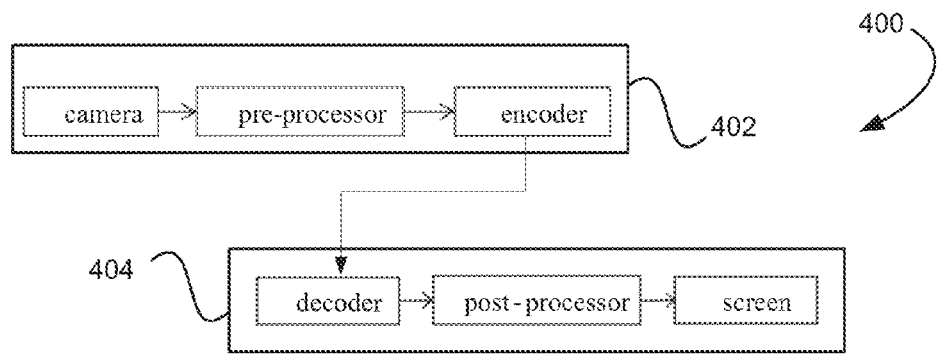
Figure 8B:
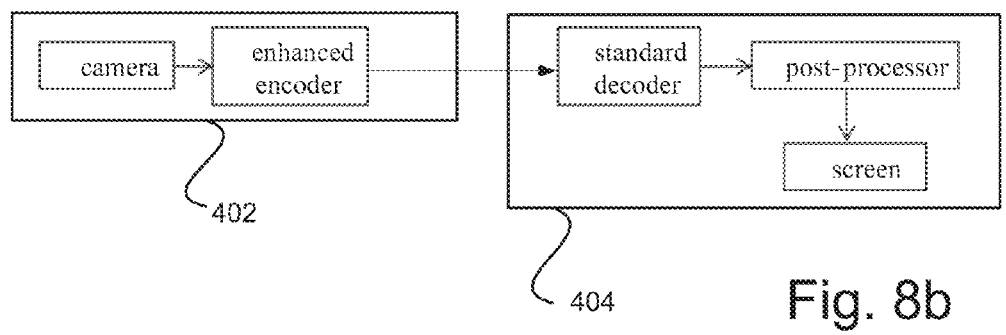
Figure 8C:
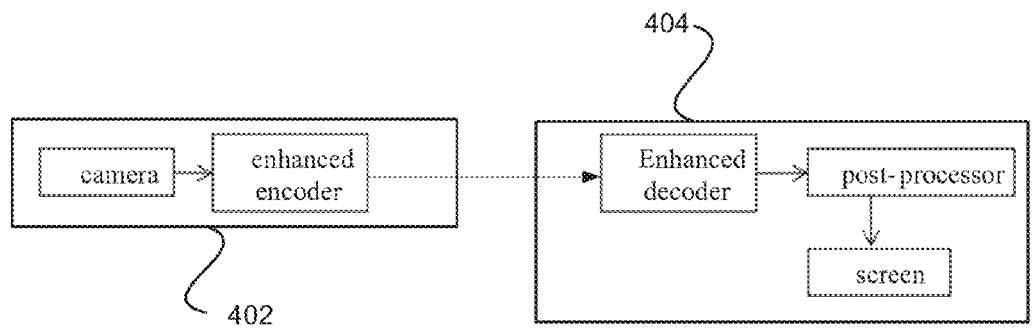
Figure 8D:
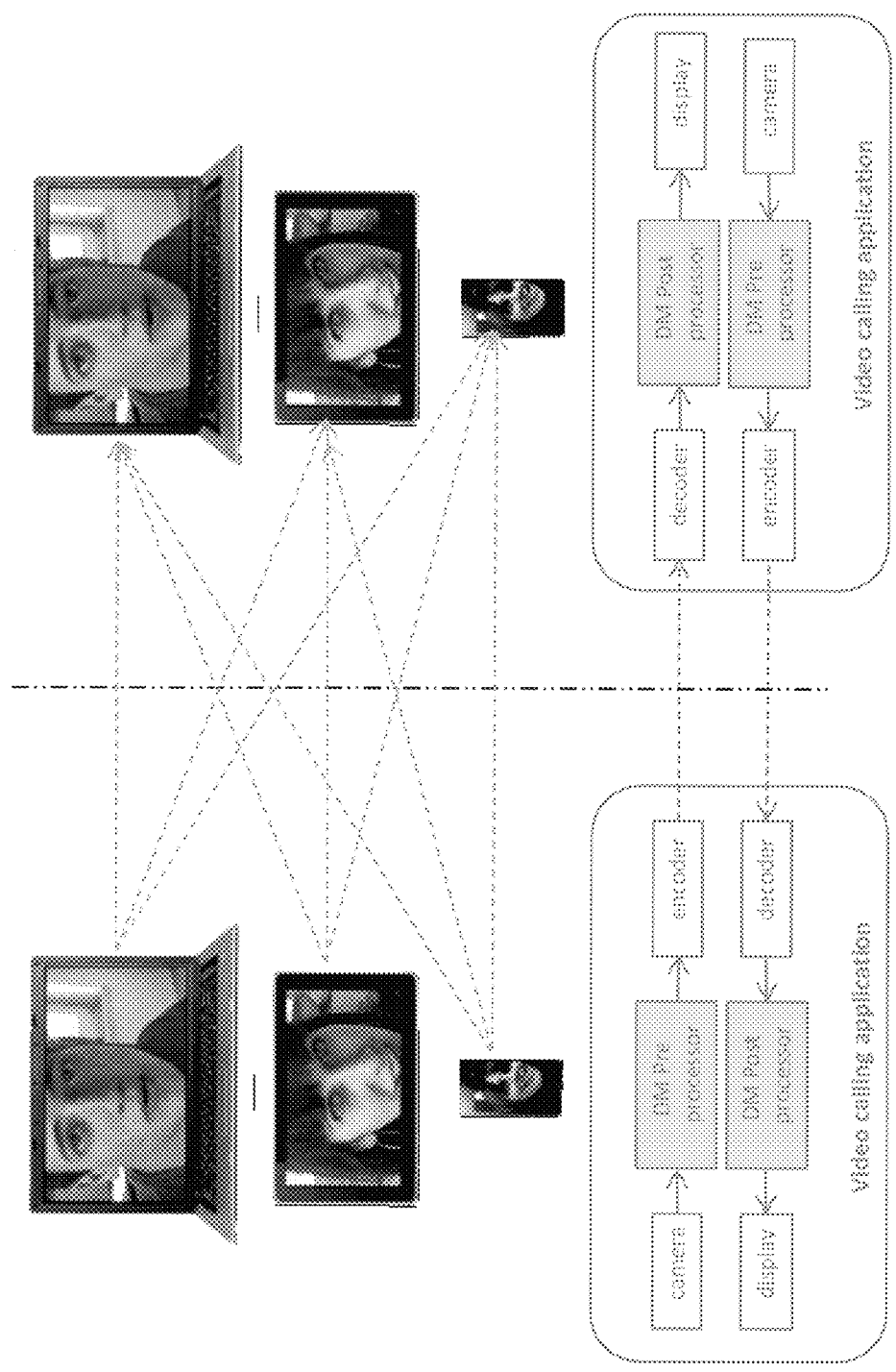

In FIGS. 8a-8c, the block diagrams illustrate such pre- and post-processors in conjunction with encoders and decoders. A more specific video calling configuration is illustrated in FIG. 8d.

For example, in video calling and video conferencing, the DM technique (as described above in FIGS. 2a-2d, 6a-6d) may be utilized as a pre-processor for facial image retouching, after which the imagery is compressed and transmitted. In high bandwidth applications, image detail and motion generally underlie the quality of the displayed image on the receiving side, while in low bandwidth applications, image detail is often lost and displayed image quality is dominated by the compression artifacts (e.g. quantization noise, block noise, mosquito noise).

In FIG. 8a, a communication system 400 is exemplified, in which a standard encoder-decoder with a pre-processing and/or and post-processing implementation is provided. A sending device 402 includes a camera for capturing a facial image (on-line mode) or a storage device in which the image data previously captured by camera is stored (off-line mode), a pre-processor for reducing noise in the image, and an encoder for encoding the image for transmission. A receiving device 404 includes a decoder to decode the incoming transmission, and a post-processor for reducing noise in the image before the image is displayed on a screen. According to some embodiments of the present invention, facial imperfection reduction and image improvement may be implemented in the pre-processor on the sending device 402 or in the post-processor on the receiving device 404, or the modules and utilities of the system of the present invention are distributed between the pre-processor and the post-processor.

In FIG. 8b, the pre-processing and encoding functions are performed by an enhanced encoder on the sending device 402. The DM processing may be implemented by the enhanced encoder on the sending device 402 whereby the post-processor on the receiving device 404 assesses decoded image quality and noise/artifacts and transmits back to the enhanced encoder what level of pre-processing it should apply to achieve improved image quality in a specific transmission circumstance of available bandwidth, data loss (e.g. packets) etc. Optionally, such decoded image quality criteria can be additionally applied by said post processor on the receiving device 404.

In FIG. 8c the DM process replaces the existing deblocking filter in the motion compensation loop of H.264 encoding and decoding processes. Such motion compensation loop is inherent to the widely-used video compression standards, whereby current deblocking filter in H.264 codec is a processing feature implemented in both the encoding and decoding motion compensation loops. If the DM process is used instead in such motion compensation loops, then such encoder and decoder are considered part of the system of the present invention. The main advantage in using the DM in this manner is an improvement of the reduction of blocking, noise and compression artifacts and therefore improvement of the compression capability of the codec due to reduction in signal redundancy.

The existing deblocking filters can modify between 1-3 samples on either side of a given block edge. In the current invention, the DM process may be used in a similar manner, only its effect is significantly stronger as its MDAF implementations affect many more pixels in the vicinity of block artifacted edges. This is due to the fact that the DM MDAF approach provides for recursively processing the image data thereby achieving an extensive size of equivalent spatial integration of pixels.

Moreover, when a video stream is encoded, a deblocking filter strength may require adaptation to a computed image error due to quantization step size and/or motion compensation errors. Pixel-based dynamic control of deblocking is easily achieved by the DM.

In the system 400 of FIGS. 8a-8c, a DM processing may be performed by the pre-processor for adaptive facial alteration, and also by the post-processor for compression artifact reduction. Because, the DM process reduces facial signal variability, the data included in a facial image output by the digital makeup technique of the present invention is decreased as it is more highly correlated spatially, and a ~5%-10% bandwidth reduction may be achieved. This actual bandwidth saving may also depend on the size of the head/face relative to the image size. A more significant bandwidth saving of ~10%-100% may be achieved when transmitting a downscaled image after applying DM, thereby avoiding the display of excessive facial artifacts when upscaling back for display at the receiver end. The result is a displayed facial image that is more pleasing and becoming to the user, yet requiring significantly less bandwidth.

FIG. 8d illustrates the integration of the DM processing in everyday communication devices (such as computer, tablet computer, and cellular phones). These communication devices may be used as both transmitters and receivers of the facial image.

Referring now to FIGS. 9a-9c, there are illustrated detailed implementations of the DM processing in known hardware/software packages.

FIG. 9a depicts a video calling software/application utilizing the present invention. In this example, the application accesses the camera imagery (through the camera's driver), the DM process Library (through its application programming interface API), display (through the display's driver) and codec (through the API), and saves user defined DM parameters in an ini file. FIG. 9b depicts an example of a video calling application utilizing the present invention, in which the application accesses the camera through a virtual camera driver (VCD). The VCD accesses the DM process Library, and can be generalized to access any camera through respective API. Such VCD may also be implemented as embedded firmware running in the camera device. The advantage of VCDs is in that they can be generic to all video calling applications, whereby the VCD is identified as a camera device although it is actually software implemented and performs the actual video accessing from the camera devices on the imaging device. For example, mobile smart phones and tablets often have front and back cameras that may be chosen by a single VCD, such that any DM processing is applied generically by the single VCD on all such available cameras (e.g. webcams). FIG. 9c depicts an embodiment of a digital mirror (Java-implemented) application using the present invention, in which the application accesses the camera (either through the camera driver or a VCD), applies the DM process to the input video stream, and displays the input image and processed image result in a side-by-side manner. This enables users to see themselves before and after simulated makeup. In video calling applications, the digital mirror function may be used for the user to define suitable DM processing parameters (placed in an ini file) prior to actually placing a video call.

The DM process can also be applied to digital TV broadcast and filming applications in studio settings (e.g. talk shows, interviews, news casting). The DM may be implemented into the studio TV cameras or as an external standalone post-processor. The DM process may also be implemented in firmware of camcorders, webcams, codecs and displays.

In a similar manner as applied to video streams, the DM process may also be applied to still photographs, either before the image compression stage (e.g. JPEG), or after its decoding and before display or printing. The DM process in this invention may be applied to the entire image or alternatively more selectively in face or skin regions of the image, similarly to the approach taken for the DM morphology function above.

It should be understood that the system of the present invention, i.e. its data processing and analyzing utility utilizing the above-described filtering modules, may actually be embedded in any electronic device having an imager (camera) or any electronic device capable of receiving image data from an external imager. Also, the data processing and analyzing utility of the present invention may be implemented as a pure software product which may be downloaded into an electronic device such as a phone device, tablet, PC etc. (e.g. via a network such as the Internet) in the form of an API.

In an embodiment of this invention image regions that contain faces and skin may be manually designated. This is preferably achieved by a single localized single tap ("one-touch") on a touch screen such as those used in smart phones and tablets. A continuous localized touch may activate a localized face or skin segmentation that can present to the user the intermediate segmentation result such that the user stops the continuous touch once the process seems to have segmented the desired face/skin region, after which the DM process is applied. Alternatively, the DM process can be applied in batch mode on multiple images. The DM may also be used in conjunction with automatic gain control (AGC) and dynamic rage compression (DRC) of cameras.

Various embodiments and aspects of the present invention as delineated hereinabove and as claimed in the claims section below find experimental support in the following examples.

Reference is now made to the following examples, which together with the above descriptions illustrate some embodiments of the invention in a non limiting fashion.

Figure 10:
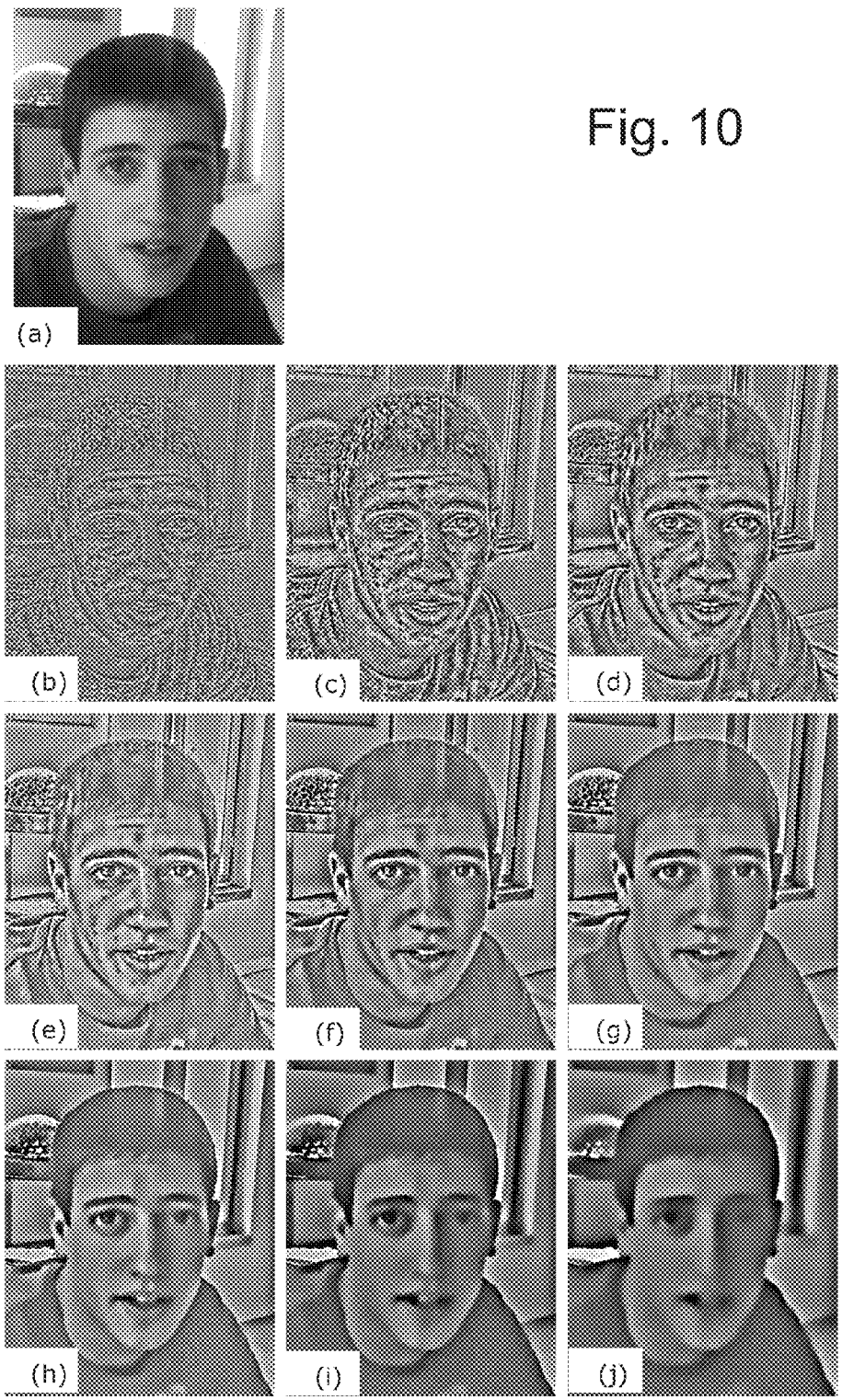
FIGS. 10 and 11 illustrated a plurality of images yielded by different filters, according to some embodiments of the present invention.
Figure 11:
Figure 11:
Figure 11:
Figure 11:
Figure 11:
Figure 11:
Figure 11:
Figure 11:
Figure 11:
Figure 11:

FIGS. 10 and 11 illustrated a plurality of images yielded by different filters, according to some embodiments of the present invention.

FIG. 10 depicts the image decomposition example of an input luminance image (image a) (8 bit, 256 grey levels) in accordance with the embodiments of FIGS. 2c and 2d. In this example, eight MDAF filters were assigned the following a1, ..., a8 values: a1=10, a2=20, a3=30, a4=40, a5=50, a6=60, a7=70, a8=80. Thus, component signals S1, ..., S8 were yielded as differences between MDAF filters, where S1 (image b) is the high-pass signal (I-Fil1(I)), S2 is the bandpass signal (Fil1(I)-Fil2(Fil1(I))) (image c), whereby S3-S8 (images d-i) are bandpass signals, and S9 is the low-pass (pedestal) signal. The standard deviations (STDs) in grey levels of the signals S1-S8 for this example are respectively STD1=0.7, STD2=0.8, STD3=1.2, STD4=1.5, STD5=2, STD6=2.6, STD7=3.2, STD8=3.8. Since the STDs of the signals S1-S8 are small, they are histogram stretched for display purposes in FIGS. 11 b-i.

FIG. 11 represents the filtering of the same input image eight consecutive Gaussian (linear) filters. Comparing image b of FIG. 10 to image b of FIG. 11, it can be seen that the image b of FIG. 10 shows the skin texture effects and camera noise in great detail, while the image b of FIG. 11 shows the face's contours in great detail. As the filtering continues component S6 (image g) in FIG. 10 succeeds in extracting an image component that better depicts shading effects in the face, compared to the image component S6 (image g) in FIG. 11. The image component S4 in FIG. 10 (image e) succeeds in extracting an image component that better depicts the acne effects in the face, compared to the corresponding image of FIG. 11. The image components in FIG. 10 succeed avoiding overshoot artifacts along strong edges, compared to the image components in FIG. 11.

It is therefore indicated that by using MDAF filters (FIG. 10), different facial imperfections and facial effects can be extracted in the bandpass signals. Thus, using the respective T1-T8 transformations, each different imperfection can be dealt separately in a suitable manner. At the same time, applying a Gaussian filter produces a high-pass component image in which the face's contours and edges are well preserved. Thus it is advantageous to combine a Gaussian filter with a series of MDAF filters in order to process the skin imperfections while keeping the face's edges and contours. As explained above, one manner of implementing this "hybrid" filtering process, the filtering unit Fil1 of FIGS. 2b, 2c, 2d may apply a linear (Gaussian) filter, while the other filtering units may apply MDAFs. Another solution for separately processing skin effects and facial details may performed by the system 300 of FIGS. 6a-6d, in which the input signal goes through two different paths. The first path includes a linear filter and produces a high-pass signal in which the details of the face are preserved. The second path may include a plurality of MDAF's (in series or in parallel), which processes the skin effects.

Figure 12A:
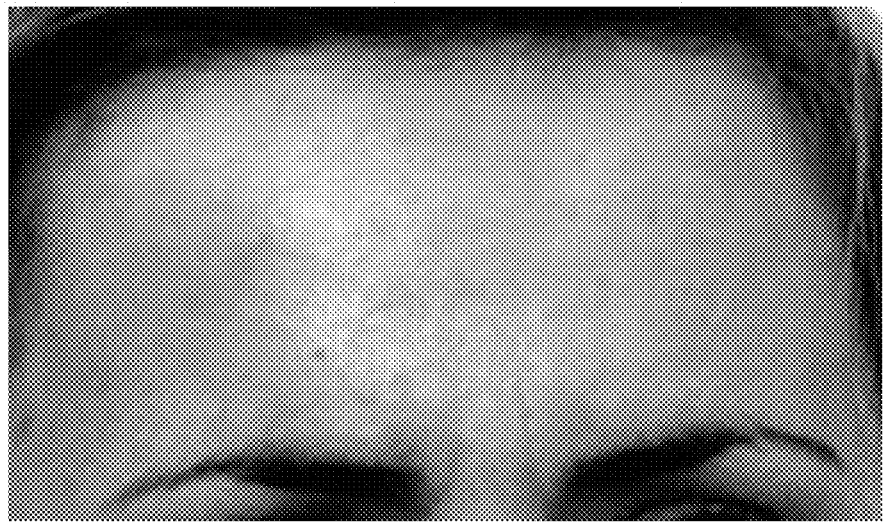
FIGS. 12a-12b are photographs of an input image and an output image yielded by the processing technique of the present invention, illustrating the achievement of a foundation effect.
Figure 12B:

Referring now to FIGS. 12a-12b, there is illustrated a foundation effect achieved by the of the technique present invention. FIG. 12a depicts an input image in which the forehead skin is textured. FIG. 12b illustrates an output image yielded by any one of the systems 200 or 300 of FIGS. 2b-2d, 6a-6d. The texture in the output image is refined (smoothed out), while edges are preserved and no discontinuities are perceived between such adjacent regions.

Figure 13A:
FIGS. 13a-13b are photographs of an input image and an output image yielded by the processing technique of the present invention, illustrating the achievement of a wrinkle-reducing effect.
Figure 13B:
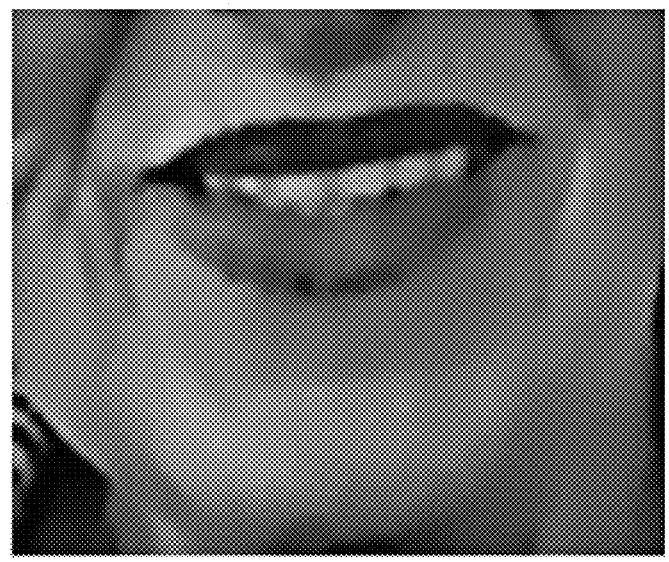

Referring now to FIGS. 13a-13b, there is illustrated a wrinkle-reducing effect achieved by the technique of the present invention. By processing the input image (FIG. 13a) via the DM technique of the present invention, an output image (FIG. 13b) is achieved, in which wrinkles are reduced, while edges are preserved and no discontinuities are perceived between such adjacent regions.

Figures 14A, 14B:
FIGS. 14a-14c are photographs of an input image and an output image yielded by the processing technique of the present invention, illustrating the achievement of a acne-concealing effect.
Figure 14C:
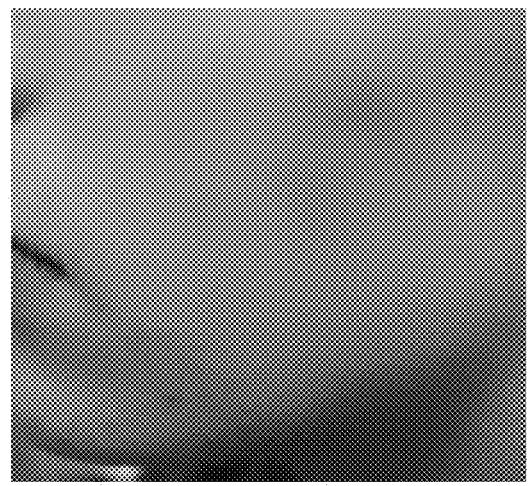

Referring now to FIGS. 14a-14c, an example of acne concealing using the DM processing technique of the present invention is illustrated. FIG. 14a is the input image, in which a subject with an acute case of acne is shown. FIG. 14b is a photograph of the same subject after a clinical (medication based) treatment. FIG. 14c is an output image (given the input image of FIG. 14a) yielded by the DM processing technique of the present invention. In the present example, respective S2 signals of the Cr color image component are thresholded by a low threshold and a higher threshold, and whereby pixels exceeding the higher threshold are filtered by a higher k value while pixels exceeding a lower threshold are a lower value of k, resulting in pixels that have a higher probability of having acne or skin irregularities being filtered more strongly, relating to the embodiment described in FIGS. 2b, 2c. A feathering operation may be used to refine the transition areas between such adjoining regions.

FIGS. 15a-15f illustrate different output images yielded by different configurations of the system of the present invention.

Figure 15A:
FIGS. 15a-15f illustrate different output images yielded by different configurations of the system of the present invention.
Figure 15B:

FIG. 15a is an input facial image. FIG. 15b is an output image, achieved by processing the input image via the DM technique of the present invention, in which α1 is used (as defined above), and the global operand a is set to be 10. In this figure, the filtering is somewhat weak and some skin imperfections can still be seen.

Figure 15C:

FIG. 15c is an output image, achieved by processing the input image via the DM technique of the present invention, in which α2 is used (as defined above), and the global operand a is set to be 10. In this figure, the skin filtering is stronger and the detail is still maintained.

Figure 15D:

FIG. 15d is an output image, achieved by processing the input image via the DM technique of the present invention, in which α1 is used (as defined above), and the global operand a is set to be 20. In this figure, the filtering is stronger than the filtering of FIG. 16b and weaker than the filtering of FIG. 16c. Detail is still maintained.

Figure 15E:

FIG. 15e is an output image, achieved by processing the input image via the DM technique of the present invention, in which α2 is used (as defined above), and the global operand a is set to be 20. In this figure, the filtering is too strong, and much of the detail is lost.

Figure 15F:

FIG. 15f is an output image, achieved by processing the input image via the DM in technique of the present invention, in which a first of MDAF filter uses α2 and a global operand a of 20, while a second MDAF filter uses α2 and a global operand a of 10, and whereby the output image is $$O=T3[S3]+T2[S2]+T1[S1]=T3[MDAF2(\alpha 2,a=20)]+ \\ T2[MDAF1(\alpha 2,a=10)-MDAF2(\alpha 2,a=20)]+T1 \\ [I-MDAF1(\alpha 2,a=20)] \quad \text{eq. 44}$$

where T3 adapts to the dynamic range of the pedestal signal S3, T2 is a gain transformation ranging typically between ~2-4 alike FIG. 4b(a), and T1 is a transformation typically alike FIG. 4c. The difference signal S2 captures the retained image contrast after removing the facial imperfections and artifacts. The difference signal S1 is further used to retain acuity while removing camera noise. Thus, detail is still maintained, while most of the skin imperfections are processed out. The process used for yielding the image of FIG. 15f is analogous to the technique shown in FIG. 2d, in which different values of a are used to determine the strength of the different filters.

FIGS. 16a-16f illustrate the effects of DM when the DM processing is applied at different stages of the communication between a transmitting and a receiving device (these devices being shown in FIGS. 9a-9d).

Figures 16A, 16B:
FIGS. 16a-16f illustrate the effects technique of the present invention when the technique is applied at different stages of the communication between a transmitting and a receiving device.
Figures 16C, 16D:
Figures 16E, 16F:

FIG. 16a is the input image. FIG. 16b is the pre-processed image at the transmitting device before encoding and compression. Note the DM effect in FIG. 16b. FIG. 16c is the decompressed (decoded) image without pre-processing, and FIG. 16d is the decompressed (decoded) image with pre-processing. FIG. 16e is the decompressed image with pre-processing, and FIG. 16f is the decompressed image with post-processing and pre-processing. Note that the images of FIGS. 16c and 16d are visually equivalent, meaning that in the present example, pre-processing is redundant, and the image quality in low bit rates can only be improved by post-processing alone. Moreover, the images of FIGS. 16e and 16f are also visually equivalent, meaning that in the present example, image quality improvement can only be achieved via post-processing alone.

Figure 17A:
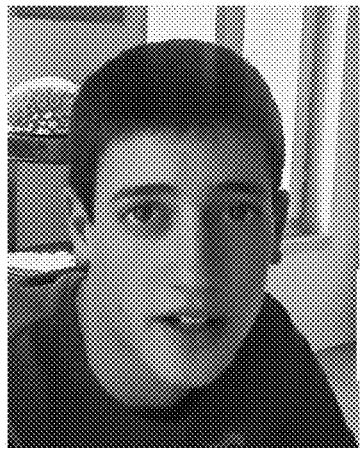
FIGS. 17a-17f represent different applications of the technique of the present invention, for altering an input image in different manners.
Figure 17D:
Figure 17B:
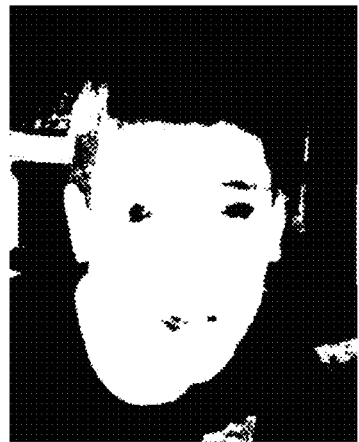
Figure 17E:
Figure 17C:
Figure 17F:

FIGS. 17a-17f represent different applications of the technique of the present invention. FIG. 17a is an input image. FIG. 17b is an output image in which image regions that behave like skin are segmented. FIG. 17c depicts an output image in which the segmented skin regions are overlaid by flag, insignia, graphic element etc onto the image. This could be used for advertisement or entertainment, for example. FIGS. 17d-17f depict output images of respective input images, in which the details are strengthened, and the skin effects are attenuated to an extreme. In this manner the output images are in the form of a comic or drawing.

Figure 18A:
FIGS. 18a-18b are photographs of an input image and an output image yielded by the processing technique of the present invention, illustrating the achievement of an aging effect.
Figure 18B:

Referring now to FIGS. 18a and 18b, there is illustrated an implementation of the technique of the present invention, in which an input image of a face (FIG. 18a) is processed to increase the skin's imperfections (e.g. wrinkles) in order to yield an output image (FIG. 18b) in which the face appears to have aged.

This processing is performed by selecting one or more transformations which highlight the skin's imperfections, rather than attenuating the skin's imperfections.

The following figures illustrate a comparison between the technique of the present invention and different noise-attenuation techniques in the art.

Figure 19A:
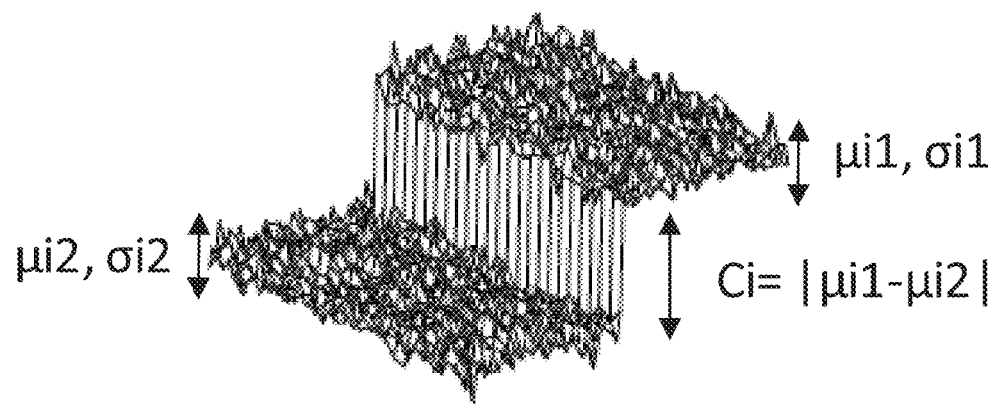
FIGS. 19a-19b are plots representing an input signal and an output signal.
Figure 19B:
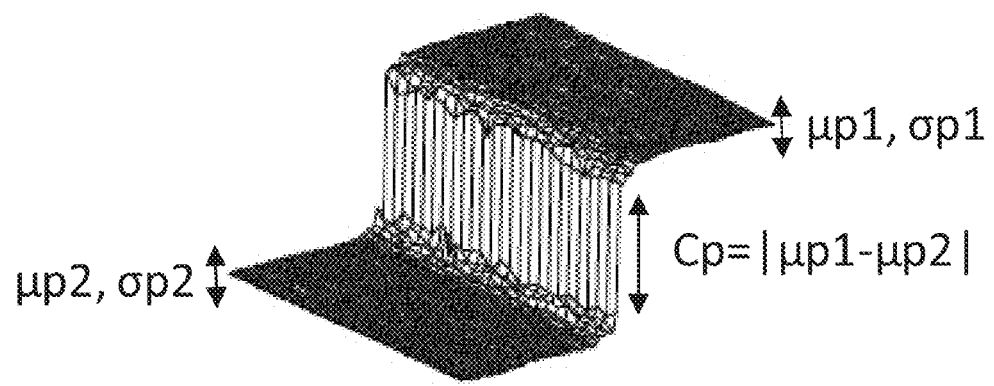

FIG. 19a shows intensity vs. position representation of an input signal. FIG. 19b shows the same representation of an output yielded after a processing of the input signal.

In these figures, i is input image, p is the processed image, C is the contrast, 1 represents the upper surface near boundary, 2 represents the lower surface near boundary, μ stands for mean, σ is the standard deviation, and RSS represents the root sum of squares.

A measure of the image's cleanliness is the Contrast to Noise Ratio (CNR), which is calculated for the input and processed images as follows:

$$CNRi=Ci/RSS(\sigma i1,\sigma i2) \quad \text{eq. 45}$$

$$CNRp=Cp/RSS(\sigma p1,\sigma p2) \quad \text{eq. 46}$$

CNR Improvement Ratio (CNRIR) measures the image improvement (noise attenuation) between the processed image and the input images.

$$CNRIR=(CNRp-CNRi)/CNRi \quad \text{eq. 47}$$

Figure 20A:
FIGS. 20a-20d and 21a-21c compare outputs yielded by different processing an input image via processing techniques known in the art to an output yielded by processing the same input image via an embodiment of the processing technique of the present invention.
Figure 20B:

FIG. 20a is a noisy input image, in which Noise $\sigma_n$~11.5 CNRi=7.6. FIG. 10b in is the output yielded after a processing of the input signal via a Median 3×3 filter. In this image, $\sigma_n$~7.5 and CNRp=12.7. In this image, the edges are preserved, but undesirable speckles are present. The limited spatial size of the Median filter limits its ability to process large image artifacts and to provide continuity in smooth image regions.

Figure 20C:

FIG. 20c is the output yielded after a processing of the input signal via a bilateral filter, sporting Radius=3 and Threshold=20. In this image $\sigma_n$~2.9 and CNRp=22.6. In this image, the edges are preserving, but severe quantization effects are present, again due to its limited spatial dimensions, but also due to the comparing step of all such pixels in the vicinity to the current pixel.

Figure 20D:

FIG. 20d is the output yielded after a processing of the input signal via the DM technique of the present invention. In this image, $\sigma_n$~2.6 (lower than the standard deviation of the previous filters) and CNRp=26.9 (higher than the Contrast to Noise Ratio of the previous filters). The DM processing of the present invention is edge preserving, and does not introduce quantization effects. The filter's size does not limit size of processed facial features.

Figure 21A:
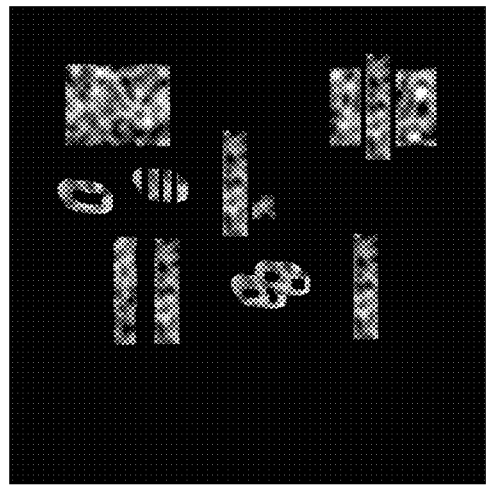
Figure 21B:
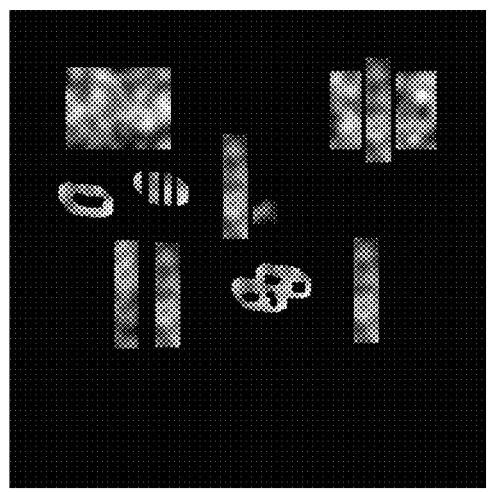
Figure 21C:
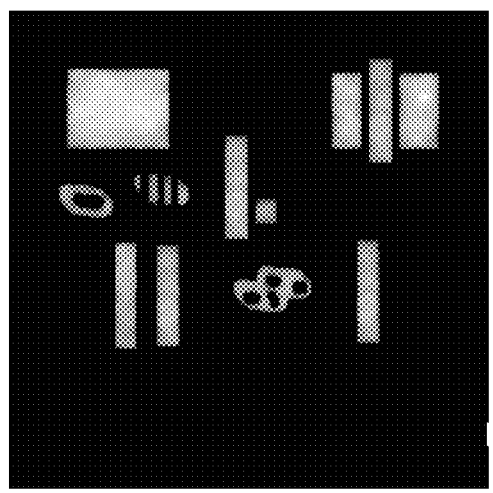

Referring now to FIGS. 21a-21c, there is shown a comparison between the speckled noise of an input image (FIG. 21a), and the speckled noise of images output by different processings (FIGS. 21b, 21c) of the input image. Generally, speckled noise texture represents facial skin imperfections (e.g. large pores, wrinkles, acne etc). In FIG. 21a, the noise standard deviation is $\sigma_n$~2.86. In FIG. 21b, the image processed by bilateral filtering results in a noise standard deviation of $\sigma_n$~1.16. In FIG. 21c, the image processed by the DM technique of the present invention results in a noise standard deviation of $\sigma_n$~0.73. Thus, the speckled noise texture is better removed by the DM technique of the present invention compared to the bilateral filter, both in reduced $\sigma_n$ (~60%) and in less perceived speckled morphology of the residual noise texture, while retaining image sharpness at transition regions.

Referring now to FIGS. 22a-22f, there are illustrated implementations of the technique of the present invention on various platforms common in today's market.

Figure 22A:
FIGS. 22a-22f are photographs which illustrate implementations of the technique of the present invention on various platforms common in today's market.
Figure 22B:
Figure 22C:
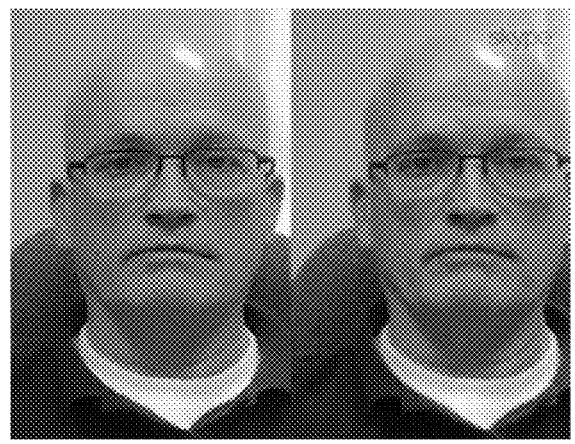

FIGS. 22a-22c illustrate how the DM technique of the present invention is applied on a Skype video call performed via a VCD implementation. The VCD is identified by the Skype application as a physical camera device, and enables selection of the respective camera to access, display mode (e.g. full processed image or side-by-side—processed vs. unprocessed), respective desired DM parameters. The VCD works under the Windows operating system (e.g. Windows XP, Windows 7, Windows 8) on PCs and laptops, and under mobile device operating system (e.g. Android, iOS, Windows 8RT). In FIGS. 22a, 22b and 22c, the images on the right-hand side are the input images, and the images on the left-hand side are the output images generated by processing the respective input images via the DM technique of the present invention. FIG. 22a depicts the removal of facial aging effects such as sagging skin in warm (filament) room light. FIG. 22b depicts the removal of facial aging effects such as sagging skin in combined room light and sunlight emerging from the right side whereby the left side of the face is shaded. FIG. 22c depicts the removal of facial aging effects such as sagging skin in cool neon room light.

Figure 22D:
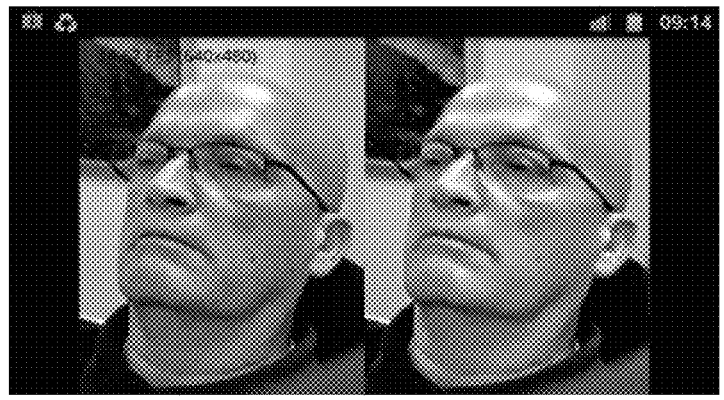
Figure 22E:
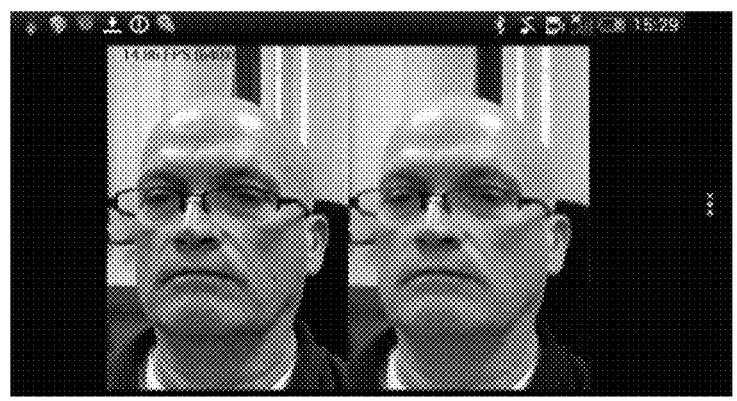
Figure 22F:

FIGS. 22d-22f illustrate an implementation of the technique of the present invention in a digital mirror application, described in FIG. 9c, running on a Samsung Galaxy S2 (GT-I9100T) handset, HTC OneX, and Samsung Tablet Galaxy Note 10.1 (GT/N8013EA), respectively. The images on the left-hand side are the input images, and the images on the right-hand side are the output images generated by processing the respective input images via the DM technique of the present invention.

The invention claimed is:

1. A system for processing an image of a human face, the system comprising a data processing and analyzing utility comprising:
a filtering system comprising a plurality of filtering modules, each filtering module being configured for receiving and processing data indicative of an input image data and generating an output signal, thereby providing a corresponding plurality of output signals indicative of different facial features, said plurality of filtering modules comprising:
a high pass filtering module comprising a first filtering utility configured for receiving the input image data, applying a first smoothing filter thereto, and outputting a first smoothed signal, and a first subtracting utility for subtracting the first smoothed signal from the input image data, thus yielding the high-pass signal indicative of at least one of edges and contours of the face in the input image data;
at least one bandpass filtering device comprising a second filtering utility, configured for receiving the input image data, applying a second smoothing filter thereto, and outputting a second smoothed signal, and a second subtracting utility for subtracting the second smoothed signal from the first smoothed signal, thus yielding at least one bandpass signal indicative of low-contrast slowly-varying qualitative features of the face; and
a low-pass filtering module configured for receiving the input image data and outputting a low-pass signal in which low-contrast regions are smoothed and high-contrast regions are preserved;
a feature computation module configured for receiving the input image data and calculating a localized feature of the image for a plurality of pixels of the image;
a strength computation module configured for receiving said localized feature from the feature computation module, using the localized feature for determining a localized operand to determine a strength for each filtering modules in said plurality of the filtering modules to be used at said plurality of the pixels, and transmitting the localized operand to each of said filtering modules;
at least one transformation module configured for receiving and altering at least a portion of at least one output signal of said plurality of output signals of the filtering modules; and
an addition module configured for receiving the output signals of the filtering modules after said at least portion of the at least one of said output signals has been altered, and for adding the received output signals together, thus yielding an output signal indicative of a characteristic of an altered image.

2. The system of claim 1, wherein the low-pass filtering module comprises the second filtering utility, the second smoothed signal being the low-pass signal.

3. A system for processing an image of a human face, the system comprising a data processing and analyzing utility comprising:
a filtering system comprising a plurality of filtering modules, each filtering module being configured for receiving and processing data indicative of an input image data and generating an output signal, thereby providing a corresponding plurality of output signals indicative of different facial features, said plurality of filtering modules comprising:
a high pass filtering module comprising a first filtering utility configured for receiving the input image data, applying a first smoothing filter thereto, and outputting a first smoothed signal, and a first subtracting utility for subtracting the first smoothed signal from the input image data, thus yielding the high-pass signal indicative of at least one of edges and contours of the face in the input image data;

at least one bandpass filtering module comprising a second filtering utility configured for receiving the first smoothed signal, applying a second smoothing filter to the first smoothed signal, and outputting a second smoothed signal, and a second subtracting utility for subtracting the second smoothed signal from the first smoothed signal, thus yielding at least one bandpass signal indicative of low-contrast slowly-varying qualitative features of the face; and a low-pass filtering module configured for receiving the input image data and outputting a low-pass signal in which low-contrast regions are smoothed and high-contrast regions are preserved;

a feature computation module configured for receiving the input image data and calculating a localized feature of the image for a plurality of pixels of the image;

a strength computation module configured for receiving said localized feature from the feature computation module, using the localized feature for determining a localized operand to determine a strength for each filtering modules in said plurality of the filtering modules to be used at said plurality of the pixels, and transmitting the localized operand to each of said filtering modules;

at least one transformation module configured for receiving and altering at least a portion of at least one output signal of said plurality of output signals of the filtering modules; and an addition module configured for receiving the output signals of the filtering modules after said at least portion of the at least one of said output signals has been altered, and for adding the received output signals together, thus yielding an output signal indicative of a characteristic of an altered image.

4. The system of claim 3, wherein the low-pass filtering module comprises the second filtering unit, the second smoothed signal being the low-pass signal.

5. The system of claim 1, wherein the strength computation module is configured for determining the localized operand to determine a strength of the smoothing filters at the plurality of the pixels, and transmitting the localized operand to the filtering utilities.

6. The system of claim 1, wherein at least one of the filtering utilities is configured for receiving an individual global parameter, and using the global parameter and the localized operand to calculate the strength of the respective smoothing filter.

7. The system of claim 1, wherein:
the strength computation module is configured for determining a plurality of localized operands, each localized operand corresponding to a respective filtering utility and being indicative of the strength of the respective smoothing filter; and
each filtering utility is configured for using the respective localized operand for determining the strength of the respective smoothing filter.

8. The system of claim 1, wherein at least one of the filtering utilities is configured for applying a multi-dimensional adaptive smoothing filter to a respective received signal.

9. The system of claim 1, wherein at least one of the filtering utilities is configured for applying a linear smoothing filter to a respective received signal.

10. The system of claim 9, wherein the first filtering utility is configured for applying the linear smoothing filter.

11. A system for processing an image of a human face, the system comprising a data processing and analyzing utility comprising:
a filtering system comprising a plurality of filtering modules, each filtering module being configured for receiving and processing data indicative of an input image data and generating an output signal, thereby providing a corresponding plurality of output signals indicative of different facial features, said plurality of filtering modules comprising:
a high pass filtering module configured for receiving the input image data indicative of a characteristic of the image and outputting a high-pass signal indicative of at least one of edges and contours of the face in the input image data;
an array of bandpass filtering modules, wherein each bandpass filtering module comprises: a respective filtering utility configured for receiving said data indicative of the input image data and applying a respective smoothing filter thereto, and outputting a respective smoothed signal; and a respective subtracting utility for subtracting the respective smoothed signal from a previously smoothed signal output by a preceding filtering utility comprised in a preceding filtering module, thus yielding a respective bandpass signal;
a low-pass filtering module configured for receiving the input image data and outputting a low-pass signal in which low-contrast regions are smoothed and high-contrast regions are preserved;
a feature computation module configured for receiving the input image data and calculating a localized feature of the image for a plurality of pixels of the image;
a strength computation module configured for receiving said localized feature from the feature computation module, using the localized feature for determining a localized operand to determine a strength for each filtering modules in said plurality of the filtering modules to be used at said plurality of the pixels, and transmitting the localized operand to each of said filtering modules;
at least one transformation module configured for receiving and altering at least a portion of at least one output signal of said plurality of output signals of the filtering modules; and
an addition module configured for receiving the output signals of the filtering modules after said at least portion of the at least one of said output signals has been altered, and for adding the received output signals together, thus yielding an output signal indicative of a characteristic of an altered image.

12. The system of claim 11, wherein the low-pass filtering module comprises a filtering utility being a part of a last bandpass filtering module in said array of the bandpass filtering modules, to generate a last smoothed signal being the low-pass signal.

13. A system for processing an image of a human face, the system comprising:
a first high-pass filtering module configured for receiving an input image data indicative of a characteristic of the image and outputting a first high-pass signal indicative of at least edges or contours of the face in the image;
a decimating module configured for receiving the input image data, and processing the received image data for reducing a size of the input image to produce a first decimated image, and outputting a decimated signal indicative of the first decimated image;

a filtering system, configured for receiving and processing the first decimated signal, and outputting a first output signal indicative of a first output image;

an interpolation module configured for receiving the first output signal, and interpolating the first output signal to output an interpolated signal indicative of an image having a size equal to the size of the input image; and a first addition module configured for receiving the interpolated signal and the first high-pass signal, and adding the interpolated signal and the first high-pass signal together, thus yielding a second output signal indicative of a characteristic of an altered image.

14. The system of claim 13, comprising a first transformation module configured for altering at least a portion of the first high-pass signal to output a first transformed signal, the first addition module being configured for receiving the interpolated signal and the first transformed signal, and adding them together, thus yielding a second output signal indicative of a characteristic of an altered image.

15. The system of claim 13, wherein the first high-pass filtering module comprises: a second interpolation module configured for receiving the decimated signal and interpolating the decimated signal to output a second interpolated signal, the first high-pass filtering module being configured for receiving the input image data and the second interpolated signal; and a first subtracting unit configured for subtracting the second interpolated signal from the input image data thus yielding the first high-pass signal.

16. The system of claim 15, comprising a second decimating module configured for performing a second decimation on the first decimated signal to output a second decimated signal, which is received and processed by said filtering system to output the first output signal.

17. A method for processing an input signal indicative of a characteristic of an image of a human face, the method being implemented by a data processing and analyzing utility and comprising:

applying a first high-pass filter to input image data to generate a first high-pass signal indicative of at least edges or contours of the face in the image;

decimating the input image data to output a decimated signal indicative of an image of reduced size with respect to the input image;

processing the decimated signal to calculate a localized feature of the image for a plurality of pixels of the image;

using the localized feature for determining a localized operand;

applying a high-pass filter, at least one bandpass filter, and a low-pass filter to the decimated signal, thus generating a high-pass component signal, at least one bandpass component signal, and a low-pass component signal, such that a strength of each filter is dependent on the localized operand;

applying at least one transformation to at least one of the high-pass component signal, the bandpass component signal, and the low-pass component signal, for altering at least a portion of the at least one of the component signals;

adding the component signals after at least one of said component has been altered, thus yielding an output signal indicative of a characteristic of an altered image;

interpolating the output signal to output an interpolated signal indicative of an image having a size equal to the size of the input image; and adding the first high-pass signal to the interpolated signal thus yielding a second output signal indicative of a characteristic of an altered image.

18. A non-transitory computer readable medium storing instructions that, when executed by a computer implementing a data processing and analyzing utility, cause the computer to carry out the following:

process input image data to calculate a localized feature of the image for a plurality of pixels of the image;

use the localized feature for determining a localized operand;

apply a high-pass filter, at least one bandpass filter, and a low-pass filter to the input image data, thus generating a high-pass component signal, at least one bandpass component signal, and a low-pass component signal, such that a strength of each filter is dependent on the localized operand, wherein applying the high-pass filter comprises applying a first smoothing filter to the input image to provide a first smoothed signal, and subtracting the first smoothed signal from the input image data, thus yielding the high-pass component signal, and applying the at least one bandpass filter comprises applying a second smoothing filter to the input image data to provide a second smoothed signal, and subtracting the second smoothed signal from the first smoothed signal, thus yielding the at least one bandpass component signal;

apply at least one transformation to at least one of the high-pass component signal, bandpass component signal, and low-pass component signal, for altering at least a portion of at least one of the component signals; and add the component signals after at least one of said components has been altered, thus yielding an output signal indicative of a characteristic of an altered image.

* * * * *